(12) United States Patent
Wanasundara et al.

(10) Patent No.: US 8,557,963 B2
(45) Date of Patent: Oct. 15, 2013

(54) PROCESS OF AQUEOUS PROTEIN EXTRACTION FROM BRASSICACEAE OILSEEDS

(75) Inventors: Janitha P. D. Wanasundara, Saskatoon (CA); Tara C. McIntosh, Saskatoon (CA)

(73) Assignee: Her Majesty the Queen in Right of Canada, as Represented by the Minister of Agriculture and Agri-food, Saskatchewan (CA)

( * ) Notice: Subject to any disclaimer, the term of this patent is extended or adjusted under 35 U.S.C. 154(b) by 22 days.

(21) Appl. No.: 12/451,804

(22) PCT Filed: May 30, 2008

(86) PCT No.: PCT/CA2008/001055
§ 371 (c)(1),
(2), (4) Date: May 27, 2010

(87) PCT Pub. No.: WO2008/144939
PCT Pub. Date: Dec. 4, 2008

(65) Prior Publication Data
US 2010/0249378 A1    Sep. 30, 2010

Related U.S. Application Data

(60) Provisional application No. 60/932,654, filed on Jun. 1, 2007.

(51) Int. Cl.
*A23J 1/14* (2006.01)
*A23J 1/00* (2006.01)

(52) U.S. Cl.
USPC .......................... 530/377; 530/422; 426/656

(58) Field of Classification Search
None
See application file for complete search history.

(56) References Cited

U.S. PATENT DOCUMENTS 2,331,619 A * 10/1943 Morse ........................... 530/378
4,208,323 A    6/1980 Murray et al. ................ 530/372
(Continued)

FOREIGN PATENT DOCUMENTS

CA         2613103       1/2007
EP        08757191.5     5/2008
(Continued)

OTHER PUBLICATIONS

Berot, S, Compoint, JP, Larre, C, Malabat, C, Gueguen, J Large scale purification of rapeseed proteins (*Brassica napus* L.) Journal of Chromatography B 818 (2005) 35-42.*

(Continued)

*Primary Examiner* — Humera Sheikh
*Assistant Examiner* — Subbalakshmi Prakash
(74) *Attorney, Agent, or Firm* — Ballard Spahr LLP

(57) ABSTRACT

A process of aqueous protein extraction from Brassicaceae oilseed meal, such as canola, commercial canola meal or yellow mustard, to obtain a napin-rich protein extract, a cruciferin-rich protein extract, and a low-protein residue. The process comprising the steps of performing aqueous extraction of the Brassicaceae oilseed meal at a pH of from about 2.5 to about 5.0 to obtain a soluble napin-rich protein extract and a cruciferin-rich residue followed by performing aqueous extraction of the cruciferin-rich residue to obtain a soluble cruciferin-rich protein extract and a low-protein residue. The cruciferin-rich residue may be treated with cell wall degrading enzymes to obtain a cruciferin-rich fraction The cruciferin-rich protein products may be substantially free of napin protein and may be useful as a non-allergenic food product for human consumption.

16 Claims, 16 Drawing Sheets

(56) References Cited

U.S. PATENT DOCUMENTS

| | | | |
|---|---|---|---|
| 4,889,921 A * | 12/1989 | Diosady et al. | 530/377 |
| 5,994,622 A | 11/1999 | Jofuku et al. | 800/260 |
| 6,800,308 B2 * | 10/2004 | Maenz et al. | 426/44 |
| 6,905,713 B2 | 6/2005 | Diosady et al. | 424/725 |
| 7,090,887 B2 | 8/2006 | Newkirk et al. | 426/629 |
| 7,618,659 B2 | 11/2009 | Gosnell et al. | 424/776 |
| 7,662,922 B2 | 2/2010 | Logie et al. | 530/376 |
| 2005/0136162 A1 * | 6/2005 | Kvist et al. | 426/455 |
| 2005/0181112 A1 | 8/2005 | Schweizer et al. | 426/590 |
| 2005/0249828 A1 * | 11/2005 | Logie et al. | 424/755 |
| 2007/0004908 A1 * | 1/2007 | Gosnell et al. | 530/377 |

FOREIGN PATENT DOCUMENTS

| | | |
|---|---|---|
| WO | WO 97/27761 | 8/1997 |
| WO | PCT/2008/001055 | 5/2008 |

OTHER PUBLICATIONS

Klockeman, DM, Toledo, R, Sims A. Isolation and characterization of defatted canola meal protein. Journal of Agricultural and Food Chemistry 45 (1997) pp. 3867-3870.*

Excerpted from : DGF Symposium Invitation "New trends in Oilseed Crushing and Processing" Mar. 13-14, 2007, Leipzig, Germany http://www.dgfett.de/meetings/archiv/leipzig2007/index.htm Krause, et al. Presentation slides posted on www.ppm-magdeburg.de accessed on Oct. 18, 2011.*

Adachi M, et al. "Crystal structure of soybean 11S globulin: Glycinin A3B4 homohexamer," *Proc Natl Acad Sci USA*, 100(12): 7395-7400 (2003).

Ansharullah, et al. "Application of Carbohydrases in Extracting Protein from Rice Bran," *J. Sci Food Agric.*, 74: 141-146 (1997).

AOCS Official Method Ba 4b-87. (1990) Nitrogen-Ammonia-Protein, Modified Kjeldahl Method, Copper Sulfate Catalyst. In *Official Methods and Recommended Practices of the AOCS* (4th Edition, pp. 1-2). American Oil Chemists' Society.

Bérot S, et al. "Large scale purification of rapeseed proteins (*Brassica napus* L.)," *J Chromatogr B.*, 818(1): 35-42 (2005).

Breen JP, et al. "Molecular analysis of a cruciferin storage protein gene family of *Brassica napus*," *Plant Mol Biol.*, 19(6): 1049-1055 (1992).

Casey, R. (1999). Distribution and Some Properties of Seed Globulins. In P.R. Shewry, & R. Casey (Eds.), *Seed Proteins* (pp. 159-169). Netherlands: Kluwer Academic Publishers.

Crouch ML, et al. "Development and storage-protein synthesis in *Brassica napus* L. embryos in vivo and in vitro," *Planta*, 153: 64-74 (1981).

Crouch ML, et al. "cDNA Clones for *Brassica napus* Seed Storage Proteins: Evidence from Nucleotide Sequence Analysis that Both Subunits of Napin Are Cleaved from a Precursor Polypeptide," *J Mol Appl Genet.*, 2(3): 273-283 (1983).

Dalgalarrondo M, et al. "Subunit Composition of the Globulin Fraction of Rapeseed (*Brassica napus* L.)," *Plant Science*, 43: 115-124 (1986).

Delseny, M., & Raynal, M. (1999). Globulin Storage Proteins in Crucifers and Non-Legume Dicotyledonous Families. In P.R. Shewry, & R. Casey (Eds.), *Seed Proteins* (pp. 427-451). Netherlands: Kluwer Academic Publishers.

Feeney, R.E. (1980). Overview on the Chemical Deteriorative Changes of Proteins and Their Consequences. In J. Whitaker (Ed.), *Chemical Deterioration of Proteins* (pp. 1-47). Washington, DC: American Chemical Society.

Gehrig PM, et al. "Assignment of the Disulfide Bonds in Napin, a Seed Storage Protein from *Brassica napus*, Using Matrix-Assisted Laser Desorption Ionization Mass Spectrometry," *Peptide Res.*, 9(6): 308-314 (1996).

Grossman MV, et al. "Extraction of Proteins from Buckwheat Bran: Application of Enzymes," *J. Food Biochemistry*, 4: 181-188 (1980).

Inquello V, et al. "Disulfide interchange reactions in 11S globulin subunits of *Cruciferae* seeds. Relationships to gene families," *Eur J Biochem.*,217(3): 891-895 (1993).

Laemmli UK. "Cleavage of Structural Proteins during the Assembly of the Head of Bacteriophage T4," *Nature*, 227: 680-685 (1970).

Lindeboom N, et al. "Interference of phenolic compounds of *Brassica napus, Brassica rapa* and *Sinapis alba* seed extracts with the Lowry protein assay," *Food Chemistry*, 104: 30-38 (2007).

Lönnerdal B, et al. "Studies on *Brassica* seed proteins. 1. The Low Molecular Weight Proteins in Rapeseed. Isolation and Characterization," *Biochim Biophys Acta.*, 278(1): 175-183 (1972).

Malabat C, et al. "Genetic variability of rapeseed protein composition," *Proceedings of 11th International Rapeseed Congress*, 1: 205-208 (2003).

Monsalve RI, et al. "A new distinct group of 2 S albumins from rapeseed. Amino acid sequence of two low molecular weight napins," *FEBS Lett.*, 295(13): 207-210 (1991).

Monsalve RI, et al. "Detection, isolation and complete amino acid sequence of an aeroallergenic protein from rapeseed flour," *Clin Exp Allergy*, 27(7): 833-841 (1997).

Monslave RI, et al. "Allergy to Mustard Seeds: The importance of 2S Albumins as Food Allergens," *Internet Symposium on Food Allergens*,3(2): 57-69 (2001).

Murén E, et al. "Structural comparison of the precursor and the mature form of napin, the 2S storage protein in *Brassica napus*," *Eur J Biochem.*, 242(2): 214-219 (1996).

Osborne, T.B. (1924) Solubility of Vegetable Proteins. In *The Vegetable Proteins* ($2^{nd}$ Edition, pp. 51-56). London: Longmans, Green and Co.

Rask L, et al. "Seed-specific Regulation of the Napin Promoter in *Brassica napus*," *J Plant Physiol.*, 152: 595-599 (1998).

Schwenke KD, et al. "Isolation of the 12 S globulin from Rapeseed (*Brassica napus* L.) and characterization as a "neutral" protein. On seed proteins. Part 13," *Die Nahrung*, 25(3): 271-280 (1981).

Siddiqui IR, et al. "Carbohydrates of Rapeseed: a review," *J Sci Fd Agric.*, 28(6): 530-538 (1977).

Sjödahl S, et al. "Characterization of the 12S globulin complex of *Brassica napus*. Evolutionary relationship to other 11-12S storage globulins," *Eur J Biochem.*, 196(3): 617-621 (1991).

Sosulski K, et al. "Carbohydrase Hydrolysis of Canola to Enhance Oil Extraction with Hexane," *JAOCS*, 65(3): 357-361 (1988).

Barciszewski J, et al. (2000) Minireview: Analysis of Rape Seed Napin Structure and Potential Roles of the Storage Protein. Protein Chem. 19(4): 249-254.

Blaicher FM, et al. (1983) Rapeseed Protein Isolates: Effect of Processing on Yield and Composition of Protein. J Agric Food Chem. 31(2): 358-362.

Crouch ML, et al. (1983) cDNA Clones for *Brassica napus* Seed Storage Proteins: Evidence from Nucleotide Sequence Analysis that Both Subunits of Napin are Cleaved from a Precursor Polypeptide. J Mol Appl Genet. 2(3): 273-283.

Kroll J. (1991) Selected functional properties of detoxified rapeseed protein preparations effected by phytic acid. Die Nahrung. 35(6): 619-624.

Lönnerdal B, et al. (1972) Studies on Brassica Seed Proteins I. The low Molecular weight proteins in rapeseed, isolation and characterization. Biochem Biophys Acta. 278(1): 175-183.

Monsalve RI, et al. (1990) Purification and Characterization of Proteins from the 2S Fraction from Seeds of the Brassicaceae Family. J Exp Botany. 41(222): 89-94.

Serraino MR, et al. (1984) Removal of Phytic Acid and Protein-Phytic Acid Interactions in Rapeseed. J. Agric Food Chem. 32(1): 38-40.

Tzeng YM, et al. (1988) Preparation of Rapeseed Protein Isolates Using Ultrafiltration, Precipitation and Diafiltration. Can Inst Food Sci Technol J. 21(4): 419-424.

Canadian Minister of Justice. Consolidation—Feeds Regulations, 1983, SOR/83-593, pp. 73-74, amended Jul. 30, 2009, available at http://laws-lois.justice.gc.ca (3 total pages).

International Preliminary Report on Patentability issued on Dec. 1, 2009 for PCT/CA2008/001055 filed May 30, 2008 and published as

(56) References Cited

OTHER PUBLICATIONS

WO 2008/144939 on Dec. 4, 2008 (Inventors—Wanasundara et al. // Applicant—Canadian Minister of Agriculture and Agri-Food) (5 pages).
International Search Report issued on Sep. 2, 2008 for PCT/CA2008/001055 filed May 30, 2008 and published as WO 2008/144939 on Dec. 4, 2008 (Inventors—Wanasundara et al. // Applicant—Canadian Minister of Agriculture and Agri-Food) (5 pages).
Written Opinion issued on Sep. 2, 2008 for PCT/CA2008/001055 filed May 30, 2008 and published as WO 2008/144939 on Dec. 4, 2008 (Inventors—Wanasundara et al. // Applicant—Canadian Minister of Agriculture and Agri-Food) (4 pages).
Amended Claim Set filed Dec. 16, 2009 for EP 08757191.5, which claims priority to for PCT/CA2008/001055 filed May 30, 2008 (Inventors—Wanasundara et al. // Applicant—Canadian Minister of Agriculture and Agri-Food) (5 pages).
Supplementary European Search Report issued on Jul. 27, 2011 for EP 08757191.5, which claims priority to for PCT/CA2008/001055 filed May 30, 2008 (Inventors—Wanasundara et al. // Applicant—Canadian Minister of Agriculture and Agri-Food) (5 pages).

\* cited by examiner

C  1 – pH 3.0 extract, 2 – pH 12.5 extract of meal residue

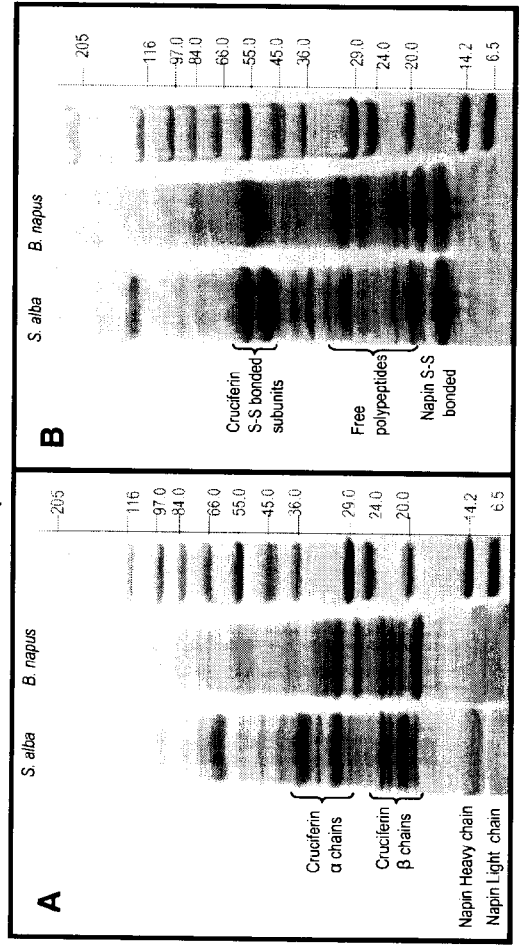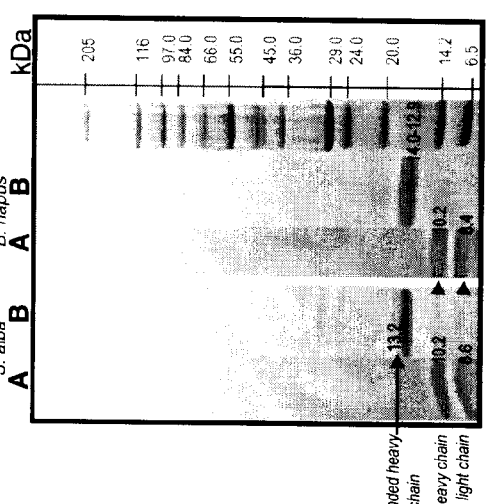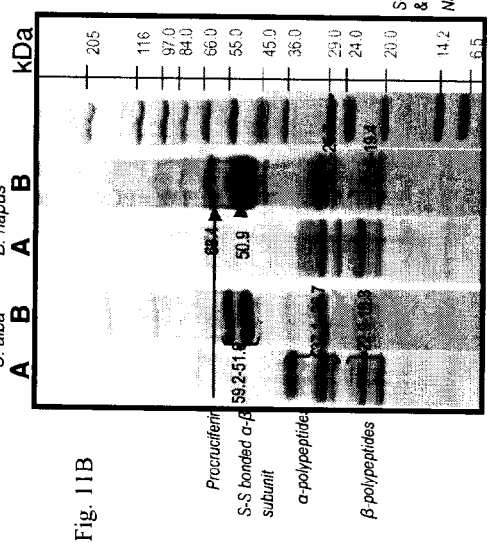
Fig. 11A
Fig. 11B
Fig. 11C

PROCESS OF AQUEOUS PROTEIN EXTRACTION FROM *BRASSICACEAE* OILSEEDS

CROSS REFERENCE TO RELATED APPLICATIONS

The present application is a National Phase Application of International Application No. PCT/CA2008/001055, filed May 30, 2008, which claims priority to U.S. Patent Application No. 60/932,654 filed Jun. 1, 2007, which applications are incorporated herein fully by this reference.

FIELD OF INVENTION

The present invention relates to a process of aqueous protein extraction from Brassicaceae oilseeds and a protein extract obtained therefrom.

BACKGROUND OF THE INVENTION

In Brassicaceae (Cruciferae) oilseeds two classes of seed storage proteins predominate; legumin-type globulins (11S, 12S or cruciferin; Schwenke et al. 1981; Sjödahl, et al. 1991) and napin-type albumins (1.7S, 2S or napin; Lönnerdal and Janson, 1972; Crouch, et al. 1983). According to the empirical classification of Osborne (1924) based on solubility, the 11S or 12S proteins are globulins and soluble in dilute salt solutions and the 1.7S or 2S proteins are albumins and soluble in water. The 11S proteins of Brassicaceae oilseeds have Mr of 300-360 kDa and are composed of six subunits (hexameric) that are arranged as two trimers (Delseny and Raynal, 1999) which are believed to be held together by hydrogen-bonded salt bridges (Adachi et al. 2003). Each subunit of this hexameric assembly is composed of acidic or $\alpha$ (~30 kDa) and basic or $\beta$ (~20 kDa) polypeptides that are linked with one disulfide bond (Delgalarrondo, 1986). The 2S proteins of Brassicaceae oilseeds has Mr of 15-18 kDa and is composed of a heavy/large (10-12 kDa) and a light/small (4-6 kDa) polypeptide that are linked by four disulfide bonds (two inter- and two intra chain) (Gehrig and Biemann, 1996; Rask et al. 1998). The 11S and 2S proteins are different in molecular structure, amino acid composition, and physico-chemical and biological properties and are thus able to provide different functionalities in practical applications.

The amount of 11S and 2S proteins of Brassicaceae species may vary. According to Crouch and Sussex (1981) cruciferin constitutes about 60% of *B. napus* seed protein at maturity. Recently, Malabat and group (2003) reported that among the European *B. napus* cultivars, the double zero (low in glucosinolates and erucic acid) varieties have higher cruciferin content (32-53% of the total proteins) than glucosinolate or erucic acid low or both contents high varieties.

Due to its high abundance and potency, Brassicaceae protein-rich meal represents a good source for recovery of plant proteins, however the allergenic potential of 2S proteins of *S. alba* (Sin a 1) and *B. juncea* (Bra j 1) is well recognized and molecular forms have been identified (Monsalve et al. 2001). The European Union has listed mustard and products as ingredients containing allergenic substances (EU Directive 2003/89/EC). The major 2S protein of *B. napus*, Bra n 1 shares 94% sequence similarity with Sin a 1 and Bra j 1 (Monsalve a al. 1997). Long term exposure to rapeseed meal may result in development of napin allergy in humans and napin is considered an occupational allergen (Monslave et al., 1997). Separation of 2S proteins from 11S proteins is required to produce an allergen-free protein product from Brassicaceae oilseeds. Furthermore, since 2S proteins and 11S proteins are structurally and biochemically different, once separated they can be utilized and formulated for different applications.

Known methods of Brassicaceae oilseed napin (2S) and cruciferin (11S or 12S) protein separation are primarily chromatographic separations (Schwenke et al. 1981). Recent work by Bérot et al., (2005) described a four-stage chromatographic separation and purification process that can be scaled up. This process provides high purity 11S and 2S proteins, however the process is long and complicated and has a low product yield.

Known aqueous extraction protein isolation methods for Brassicaceae seeds use solubility properties of the constituent proteins. These processes employ two aspects of protein solubility; solubility differences due to (1) pH or (2) ionic strength change. The patented methods of canola protein isolation by Newkirk et al. (2006), Diosady and group (1989; 2005) and the "Micellation process" (Murray et al. 1980; Murray, 1997; Schweizer et al., 2005; Gosnell et al. 2007) are variations of this basic behavior of proteins.

Processes patented by Newkirk et al. (2006) and Diosady and group (1989; 2005) describe solubilisation of seed proteins at pH values above neutral followed by precipitation of proteins by lowering the extract pH to acidic. In earlier studies only precipitated proteins were considered as the protein product. Later Diosady's group (Diosady et al. 1989; 2005) showed that when the majority of proteins were precipitated at acidic pH, some proteins still remained in the soluble form, which could be recovered from the remaining liquid by further processing. Newkirk et al. (2006) also describes a soluble protein fraction.

The Micellation process fractionates canola (*B. napus* mainly) proteins by solubilising proteins at high salt concentrations at or above neutral pH. Then a fraction of solubilised protein is recovered as hydrophobically-associated protein micelles by lowering the ionic strength in combination with bringing the pH down to mild acidic (pH 5.2-6.8) (Murray et al. 1980). Some of the proteins that remained soluble upon micelle formation can be recovered from the liquid fractions. According to Logie and Milanova (2004) the protein micelle contains primarily 7S proteins with low amounts of 12S and 2S. The liquid fraction contains primarily 2S proteins but is contaminated with 12S and 7S proteins. In legumes 7S proteins represent a distinct class of proteins which is different from 11S proteins. The legume 7S proteins have trimeric quaternary structure arrangement and no possibility of disulfide bond occurrence (Casey, 1999). In the process used by Logie and Milanova (2004) 7S protein is considered as a new protein derived from the process. It can be assumed that the conditions provided in the process may cause dissociation of hexameric 11S protein assembly into protein molecular masses that have a sedimentation coefficient of 7S, rather than true 7S proteins. However, the sedimentation coefficients of proteins are not reported for this process. The forces that keep the two trimers of the hexamer together are predominantly H-bonded salt bridges (Adachi et al. 2003) that could be disrupted due to the salting in, salting out, pH changes, temperature increase, etc. employed in this micellation process. Recent work by Gosnell et al. (2007) improved this micellation process by using a water extraction to obtain soluble proteins and then removing 7S and 12S protein by thermal treatment, pH change or ionic strength change. The remaining soluble fraction was further processed to obtain an extract consisting predominantly of 2S proteins.

The products of the above mentioned processes contain mixtures of 11S and 2S proteins. Napins and cruciferin proteins have different potential applications, due to their differences in molecular size, physico-chemical and biological properties and products containing different ratios of these two proteins may not perform these applications as well as a product containing pure or substantially pure 2S or 11S protein. Furthermore, due to the potential allergenic properties of Brassicaceae 2S protein, a method of isolating a protein extract with little or no 2S protein is required if the protein is to be used for food or other human use.

SUMMARY OF THE INVENTION

The present invention relates to a process of aqueous protein extraction from Brassicaceae oilseeds and a protein extract obtained therefrom.

It is an object of the invention to provide an improved process of aqueous protein extraction from Brassicaceae oilseeds.

According to the present invention there is provided a process (method A) of aqueous protein extraction from Brassicaceae oilseed meal to obtain a napin-rich protein extract, a cruciferin-rich protein extract, and a low-protein residue, the process comprising the steps of:
  performing aqueous extraction of Brassicaceae oilseed meal at a pH of from about 2.5 to about 5.0 to obtain a soluble napin-rich protein extract and a cruciferin-rich residue; and
  performing aqueous extraction of the cruciferin-rich residue to obtain a soluble cruciferin-rich protein extract and a low-protein residue.

The present invention pertains to the process described above wherein the cruciferin-rich protein extract is substantially free of napin protein. The cruciferein-rich protein extract may contain no napin protein.

The present invention pertains to the process described above (method A) wherein the pH of the aqueous extraction of Brassicaceae oilseed meal is from about 3 to about 5 and may be from about 3 to about 4.5 or any pH therebetween. Aqueous extraction of Brassicaceae oilseed meal may be carried out in the presence of a salt, such as but not limited to sodium chloride (NaCl) at a concentration of from about 0.25 to about 2.0 w/v. The resulting soluble napin-rich protein extract may be desalted to remove salt from the extract. Desalting may be carried out by filtration, such as but not limited to ultrafiltration/diafiltration. The napin-rich protein extract may comprise from about 50 to about 95% protein.

The present invention pertains to the process described above (method A) further comprising drying the napin-rich protein extract.

The present invention pertains to the process described above (method A) wherein the aqueous extraction of the cruciferin-rich residue is carried out at neutral or alkali pH. The pH may be from about 7.0 to about 13.0, and may be from about 8.0 to about 10.0 or any pH therebetween. The soluble cruciferin-rich protein extract may be purified by filtration, such as but not limited to ultrafiltration/diafiltration. The cruciferin-rich protein extract may comprise from about 60 to about 95% protein.

The present invention pertains to the process described above (method A) further comprising drying the cruciferin-rich protein extract.

The present invention pertains to the process described above (method A) further comprising drying the low-protein residue. The low-protein residue may comprise from about 1 to about 40% protein.

The present invention pertains to the process described above (method A) wherein the napin-rich protein extract, the cruciferin-rich protein extract and the low-protein residue comprise from about 50 to about 95% of total Brassicaceae oilseed meal protein.

The present invention pertains to the process described above (method A) wherein in the step of performing aqueous extraction of the Brassicaceae oilseed meal, the Brassicaceae oilseed meal is mixed with a solvent at a meal-to-solvent ratio of from about 1:10 to about 1:90 The meal-to-solvent ratio may be from about 1:15 to about 1:60 or any ratio therebetween. The solvent may be alcohol, such as but not limited to ethanol or isopropanol. Alternatively, the solvent may be water, optionally with a salt (such as sodium chloride) dissolved therein. The concentration of the salt may be from about 0.25 to about 2.0% w/v.

The present invention pertains to the process described above (method A) wherein the aqueous extraction of the Brassicaceae oilseed meal is carried out for about 25 to about 360 minutes. The extraction may be carried out for about 60 to about 150 minutes. The aqueous extraction of the Brassicaceae oilseed meal may be carried out at a temperature of from about 18° C. to about 50° C. and may be carried out at a temperature of from about 20° C. to about 30° C.

The present invention pertains to the process described above (method A) wherein in the step of performing aqueous extraction of the cruciferin-rich residue, the cruciferin-rich residue is mixed with a solvent at a residue-to-solvent ratio of from about 1:10 to about 1:90. The residue-to-solvent ratio may be from about 1:15 to about 1:60 or any ratio therebetween. The solvent may be alcohol, such as but not limited to ethanol or isopropanol. Alternatively, the solvent may be an aqueous alkali solution. The aqueous alkali solution may comprise NaOH with a concentration of from about 0.025 to 0.2M NaOH, and may be from about 0.05 to about 0.1M NaOH.

The present invention pertains to the process described above (method A) wherein the aqueous extraction of the cruciferin-rich residue is carried out for about 25 to about 360 minutes. The extraction may be carried out for about 60 to about 150 minutes. The aqueous extraction of the cruciferin-rich residue may be carried out at a temperature of from about 18° C. to about 50° C. and may be carried out at a temperature of from about 20° C. to about 30° C.

The present invention pertains to the process described above (method A) further comprising dehulling and defatting Brassicaceae oilseeds to obtain Brassicaceae oilseed meal prior to the step of performing aqueous extraction of Brassicaceae oilseed meal. The Brassicaceae oilseed meal may be commercial canola meal, yellow mustard flour, or the like. The commercial canola meal may be defatted prior to the step of performing aqueous extraction of Brassicaceae oilseed meal.

The present invention further provides a process (method B) of aqueous protein extraction of Brassicaceae oilseeds to obtain a napin-rich protein extract, a cruciferin-rich protein extract, and a low-protein residue, the process comprising the steps of:
  dehulling the Brassicaceae oilseeds to separate Brassicaceae oilseed cotyledons from Brassicaceae oilseed hulls;
  defatting the Brassicaceae oilseed cotyledons to obtain Brassicaceae oilseed meal;
  performing aqueous extraction of the Brassicaceae oilseed meal at a pH of from about 2.5 to about 5.0 to obtain a soluble napin-rich protein extract and a cruciferin-rich residue; and performing aqueous extraction of the cruciferin-rich residue to obtain a soluble cruciferin-rich protein extract and a low-protein residue.

The aqueous extraction in the above process (method B) can be carried out a pH range from 7.0 to about 13.0.

The present invention also includes a method to produce an aqueous protein extract from Brassicaceae oilseed meal comprising, performing aqueous extraction of the Brassicaceae oilseed meal at a pH of from about 2.5 to about 5.0 to obtain a soluble napin-rich protein extract and a cruciferin-rich residue, and performing an aqueous extraction of the cruciferin-rich residue to obtain a soluble cruciferin-rich protein extract and a low-protein residue, thereby obtaining the napin-rich protein extract, the cruciferin-rich protein extract, and the low-protein residue. Furthermore, one or more than one of the napin-rich protein extract, the cruciferin-rich protein extract, and the low-protein residue may be retained. For example, the cruciferin-rich protein extract may be retained and used as a food additive.

The present invention also provides a cruciferin-rich protein extract obtained from aqueous protein extraction which is substantially napin free. The protein extract may contain no napin. The cruciferin-rich protein extract may comprise from about 60 to about 95% protein.

The use of organic acids such as citric and alkali salt of citric acid at a pH from about 2.5 to about 5 can also be used to solubilize napin from the seed cellular matrix.

The present invention also provides a process (method C) of aqueous protein extraction from Brassicaceae oilseed meal to obtain a napin-rich protein extract, a cruciferin-rich protein extract, and a sugar rich fraction comprising:

performing a first aqueous extraction of the Brassicaceae oilseed meal at a pH of from about 2.5 to about 5.0 to obtain a soluble napin-rich protein extract and a cruciferin-rich residue; and performing a second aqueous extraction of the cruciferin-rich residue at a pH of from about 3.0 to about 4.5 in the presence of one or more cell wall degrading enzymes and separating the cruciferin-rich protein extract from a sugar rich fraction to obtain the cruciferin-rich protein extract and the sugar rich fraction.

The present invention further pertain to the process described above, (method C) wherein in the step of performing a second aqueous extraction, the temperature of the second aqueous extraction is from 40 to 60° C. The cruciferin-rich protein extract may be substantially free of napin protein.

The present invention also provides the process described above, (method C), wherein the pH of the first aqueous extraction is from about 3 to about 4.5. The first aqueous extraction may be carried out in the presence of a salt. The napin-rich protein extract may comprise from about 50 to about 95% protein, and the cruciferin-rich protein extract may comprise from about 60 to about 95% protein and is substantially free of napin protein.

As described herein, the use of one or more cell wall degrading enzymes specific to depolymerise cell wall polysaccharides can be used to reduce non-protein constituents of the residue produced during extraction. This enzyme treatment may be followed by one or more washing steps to remove depolymerised soluble polysaccharides and concentrated cruciferins in the residue. The enzyme depolymerizing process is easy to control and does not produce dark colour in the protein-rich end product. Products obtained from this process can be used in either food or non-food applications.

The present invention also provides a napin-free, cruciferin-rich protein product comprising 11S protein from 60 to 100% protein content, and from 0 to about 10% napin (2S) protein content, of the cruciferin-rich protein product, the napin-free, cruciferin-rich protein product obtained from a Brassicaceae oilseed.

As described herein, napins (2S) of Brassicaceae oilseeds can be selectively solubilized between pH 2.5 and 5. Under these conditions, the other major storage protein cruciferin remains substantially insoluble. The pH of the extraction medium is lowered using an acid, for example but not limited to a mineral acid such, for example, HCl, organic acids for example, citric acid, or a combination thereof. The solubility of napin under such low pH conditions can be enhanced by adding a chloride of alkali metal (e.g. NaCl) to the medium to ensure remaining meal residue is substantially depleted of napin.

The results described herein also demonstrate that the protein fractions have comparable essential amino acid profiles as the FAO/WHO essential amino acid requirement pattern for adults. The fractions are rich in sulfur-containing amino acids. The napin fraction especially, have higher levels of cysteine. This could be advantageous for napins that are non-allergenic such as from *B. napus*. The fractionation process described herein provides protein fractions that may be used in function-based food ingredient development.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 shows electrophoretic profiles of proteins obtained from *B. napus* and *S. alba*.

FIG. 4 shows electrophoretic profiles of proteins obtained from *B. napus* and *S. alba*.

*napus* meal and of soluble proteins of *B. napus* meal at pH 1, pH 4, pH 7 and pH 10 under reducing conditions. MWM: molecular weight markers.

Figure 5:
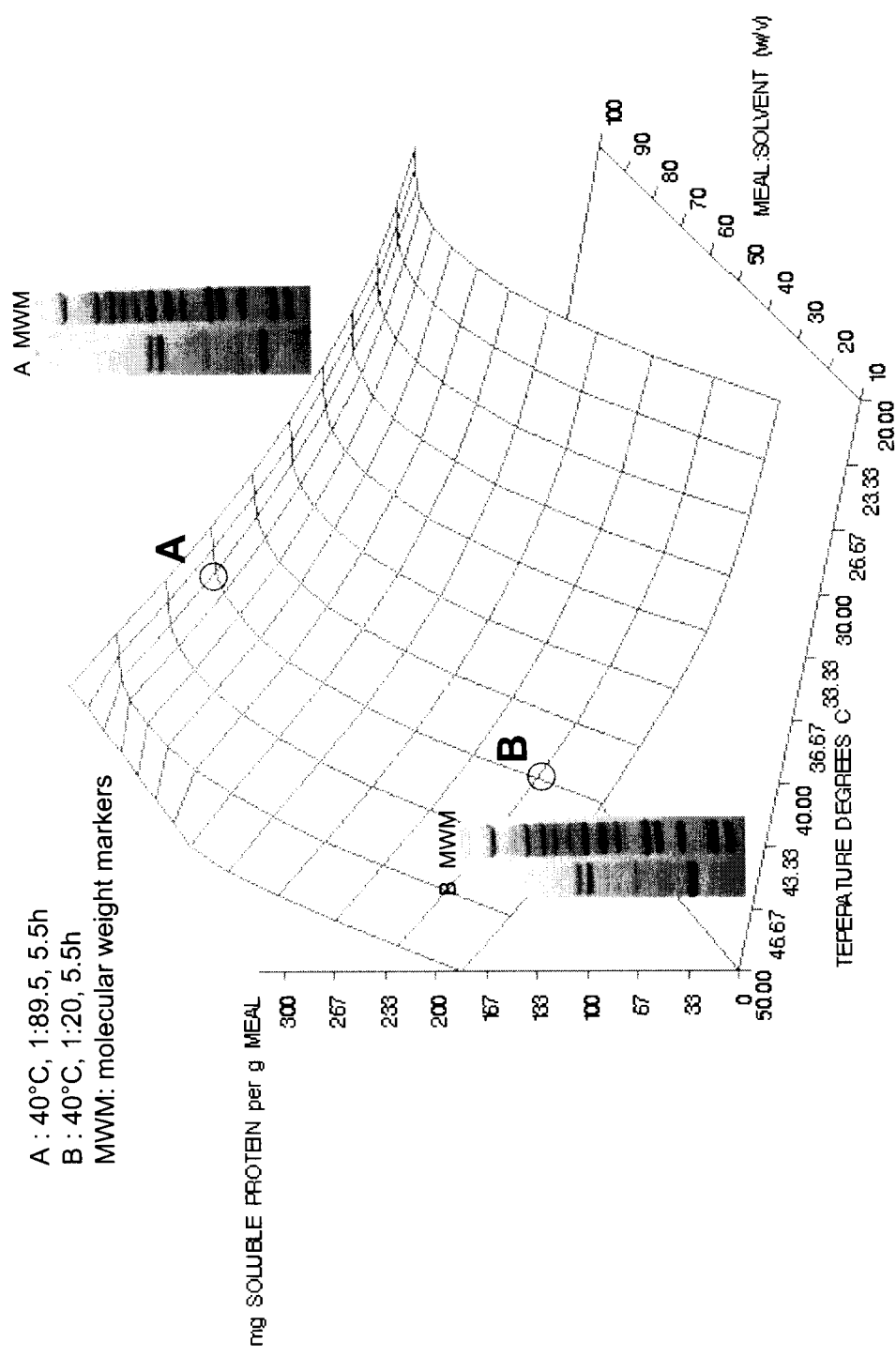

FIG. 5 shows total protein content of protein extracts at pH 4.5 as a function of meal-to-solvent ratio and temperature of extraction. Polypeptide profiles are provided to show dissolution of napin and non-napin proteins.

Figure 6A:
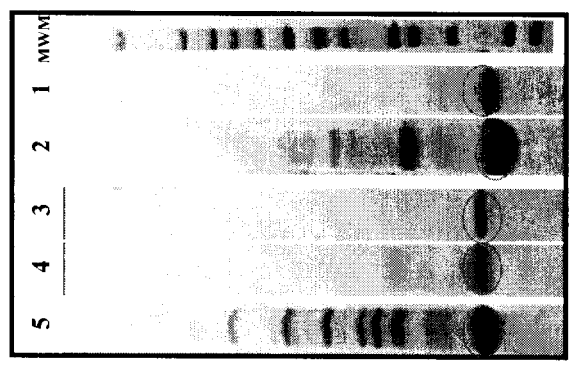
Figure 6B:
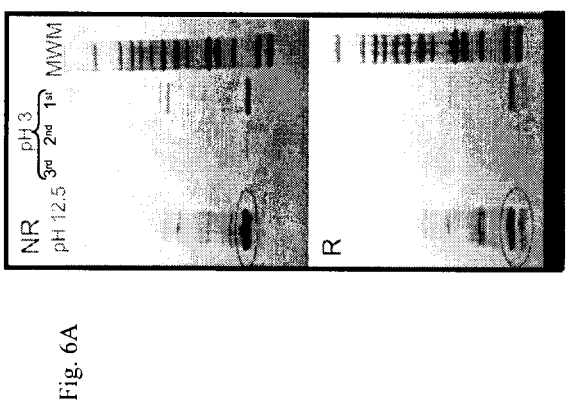
Figure 6C:
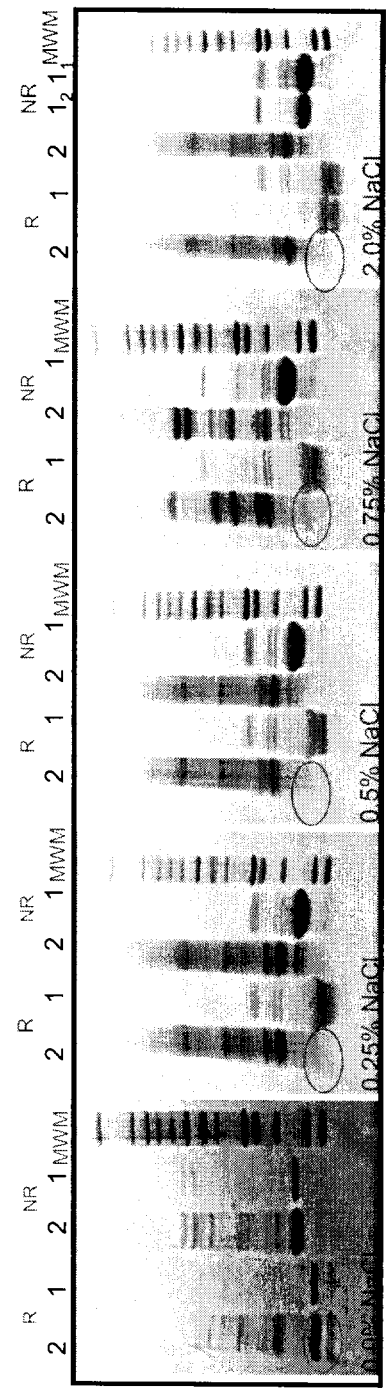

FIG. 6 shows electrophoretic profiles of proteins obtained from *S. alba*. FIG. 6A shows a SDS-PAGE separation of soluble protein extracts of *S. alba* meal using aqueous extraction at pH 3 with no additive and further aqueous extraction at pH 12.5 of the residue. NR: non-reducing conditions; R: reducing conditions. $1^{st}$, $2^{nd}$, $3^{rd}$ denotes the number of repeated extractions performed. FIG. 6B shows a SDS-PAGE separation under non-reducing conditions of soluble protein extracts of *S. alba* meal using aqueous extraction at pH 4.5 with 30% isopropanol (WA), 80% ethanol or no additive and further aqueous extraction at pH 9 of the residue. Lane 1: 30% WA, pH 4.5 soluble protein extract; Lane 2: soluble protein extract of pH 9 extract of pH 4.5, 30% IPA residue; Lane 3: 80% ethanol, pH 4.5 soluble protein extract; Lane 4: soluble protein extract of pH 9 extract of pH 4.5, 80% ethanol residue; Lane 5: soluble protein extract of pH 9 extract of pH 4.5 no additive residue. FIG. 6C shows a SDS-PAGE separation of soluble protein extracts of *S. alba* meal using aqueous extraction at pH 3 with 0.0% NaCl, 0.25% NaCl, 0.5% NaCl, 0.75% NaCl and 2.0% NaCl (Lane 1) and further aqueous extraction at pH 12.5 of the residue (Lane 2). Lane NR: non-reducing conditions; lane R: reducing conditions.

Figures 7A, 7B:
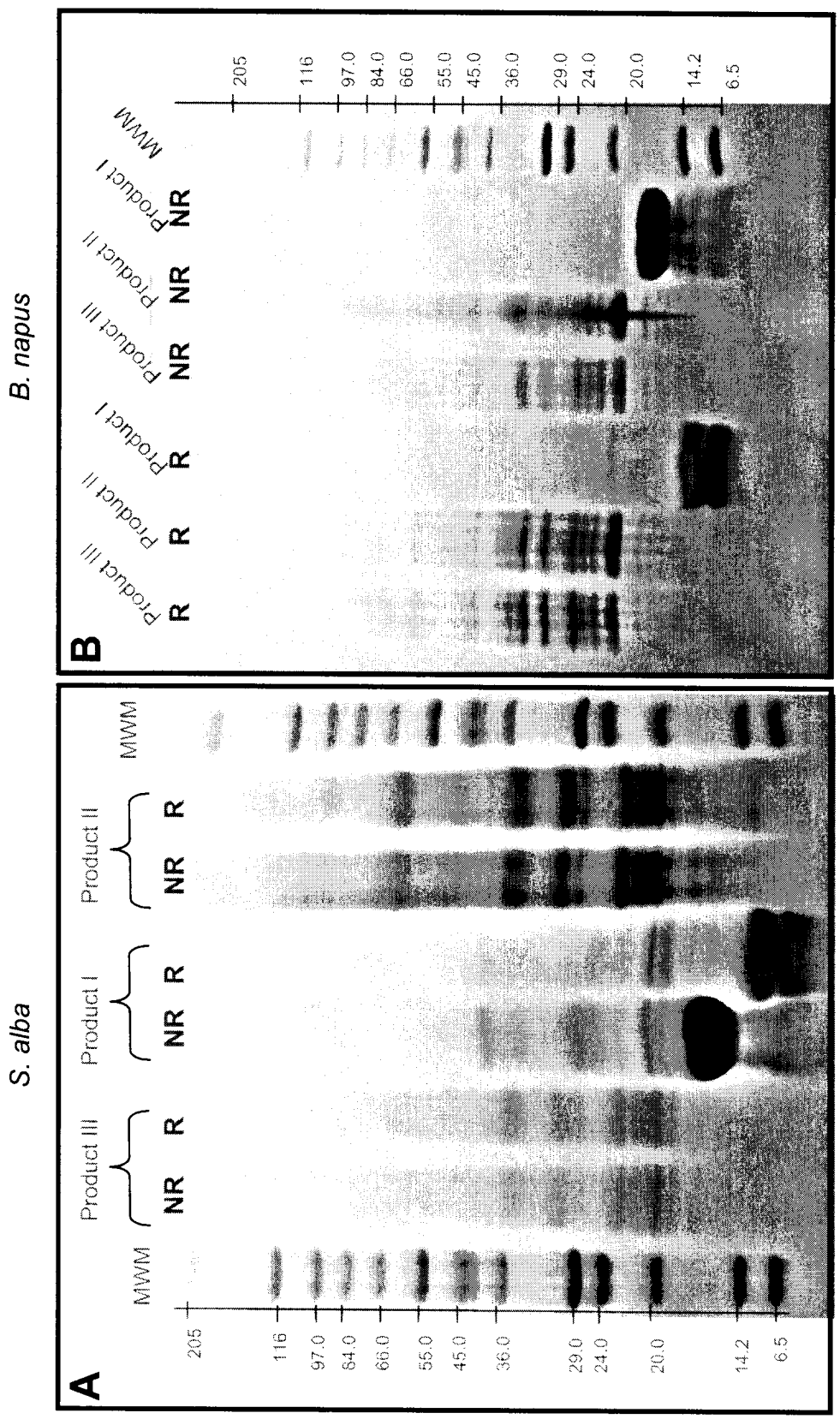

FIG. 7 shows electrophoretic profiles of proteins obtained from *B. napus* and *S. alba*. FIG. 7A shows a SDS-PAGE separation of dried napin-rich protein powder (Product I), dried cruciferin-rich protein powder (Product II) and dried protein-deficient residue (Product III) obtained from *S. alba* meal. Lane R: reducing conditions; lane NR: non-reducing conditions; and MWM: molecular weight markers.

FIG. 7B shows a SDS-PAGE separation of dried napin-rich protein isolate (Product I), dried cruciferin-rich protein isolate (Product II) and dried protein-deficient residue (Product III) obtained from *B. napus* meal. Lane R: reducing conditions; lane NR: non-reducing conditions; and MWM: molecular weight markers.

Figure 8:
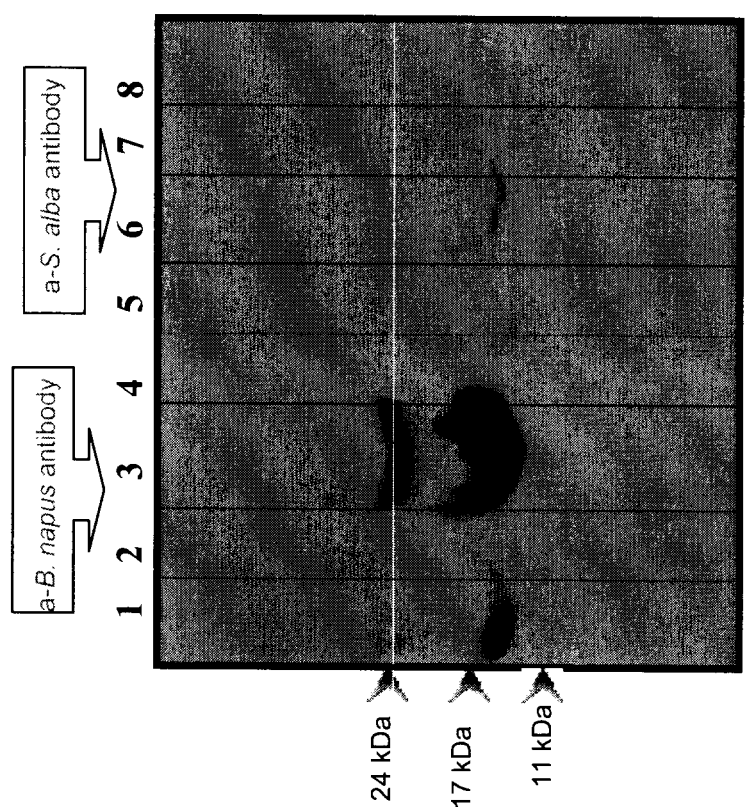

FIG. 8 shows a western blot of dried napin-rich protein isolate (Product I), dried cruciferin-rich protein isolate (Product II) and dried protein-deficient residue (Product III) obtained from *S. alba* and *B. napus* meals. Lane 1: *B. napus* meal; Lane 2: *B. napus* Product II; Lane 3: *B. napus* Product I; Lane 4: *B. napus* Product III; Lane 5: *S. alba* meal; Lane 6: *S. alba* Product I; Lane 7: *S. alba* Product II; Lane 8: *S. alba* Product III.

Figure 9:
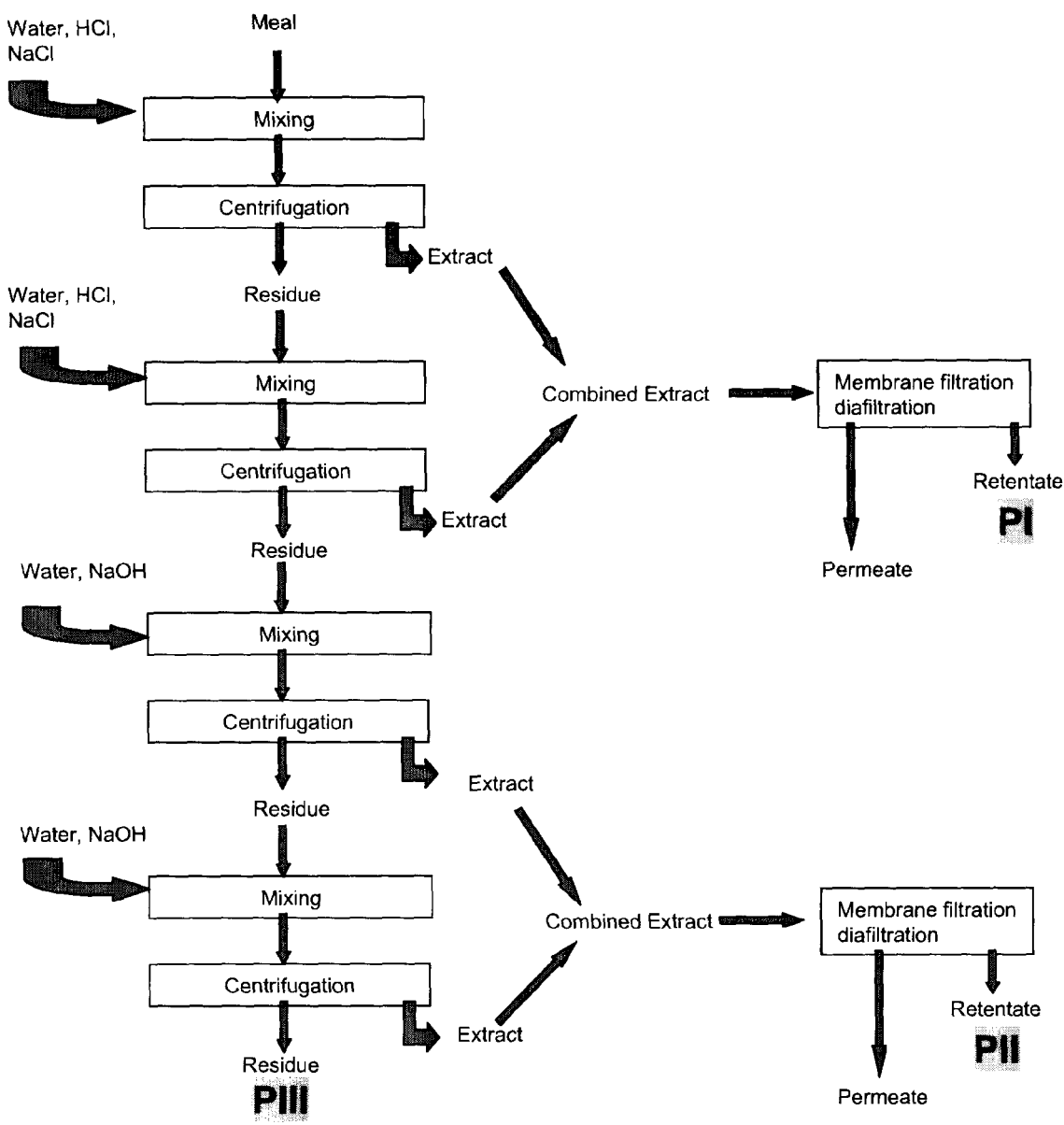

FIG. 9 shows a schematic representation of an embodiment of the aqueous protein extraction process of the present invention. PI (Product I): napin-rich protein extract; PII (Product II): cruciferin-rich protein extract (napin-free); PII (Product III): fibre-rich residue.

Figure 10:
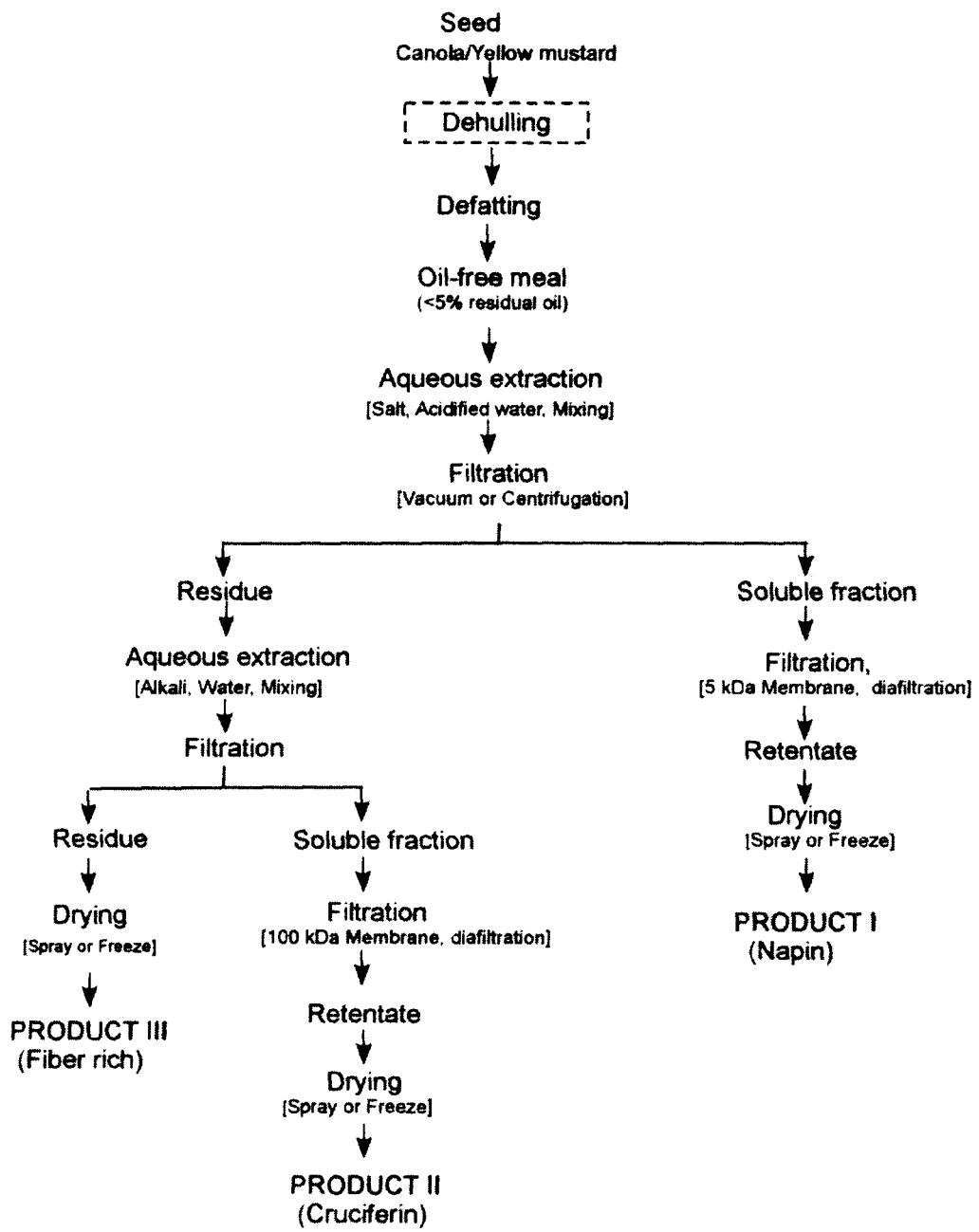

FIG. 10 shows a schematic representation of process steps of a further embodiment of the process of the present invention. Product I: napin-rich protein extract; Product II: cruciferin-rich protein extract (napin-free); Product III: fibre-rich residue.

FIG. 11 shows electrophoretic polypeptide profiles of meal proteins and purified cruciferin and napin extracted from *S. alba* or *B. napus* seed. FIG. 11A shows meal proteins separated under reducing (A) and non-reducing (B) conditions. FIG. 11B shows cruciferin profile under reducing (A) and non-reducing (B) conditions. FIG. 11C shows napin profile under reducing (A) and non-reducing (B) conditions. Right (unlabelled) lanes: molecular weight markers.

Figures 12A, 12B:
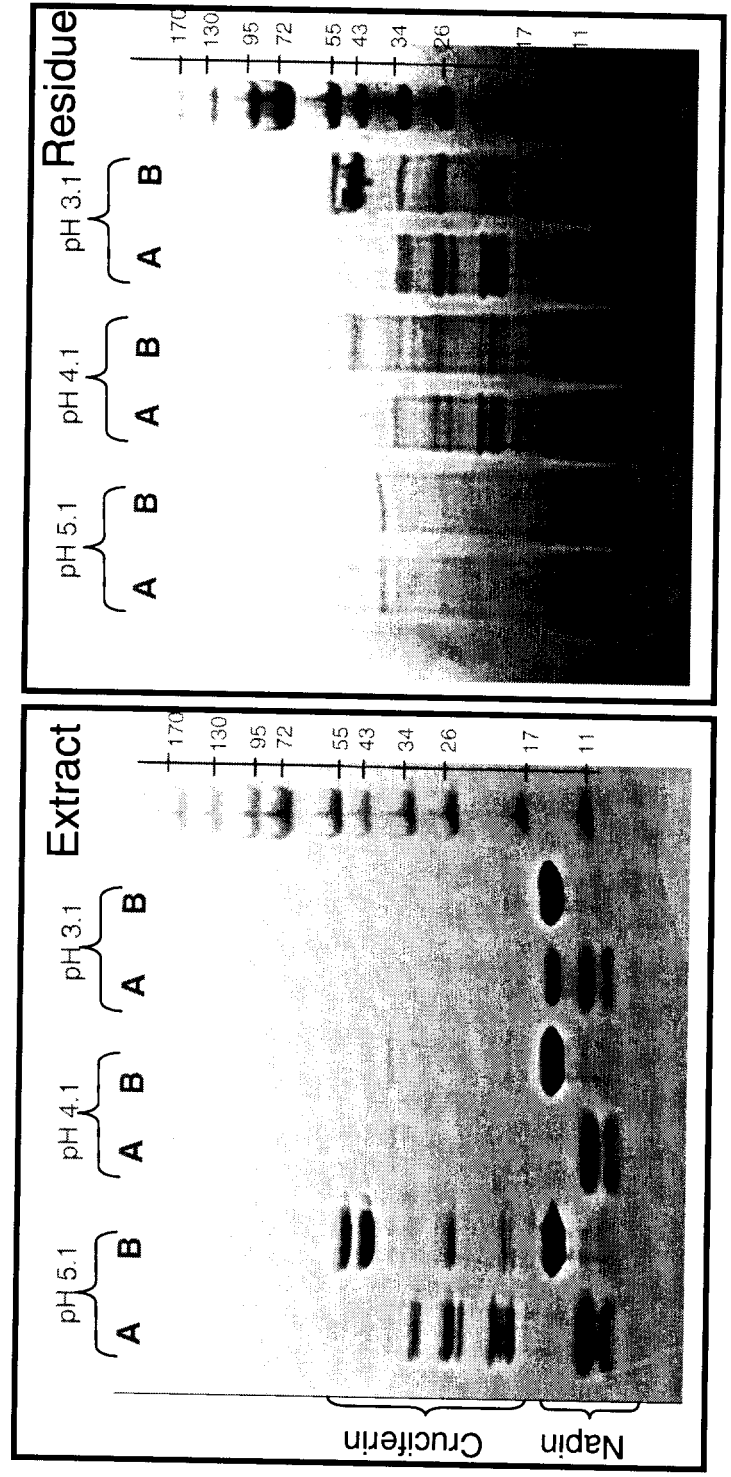
Figure 13:
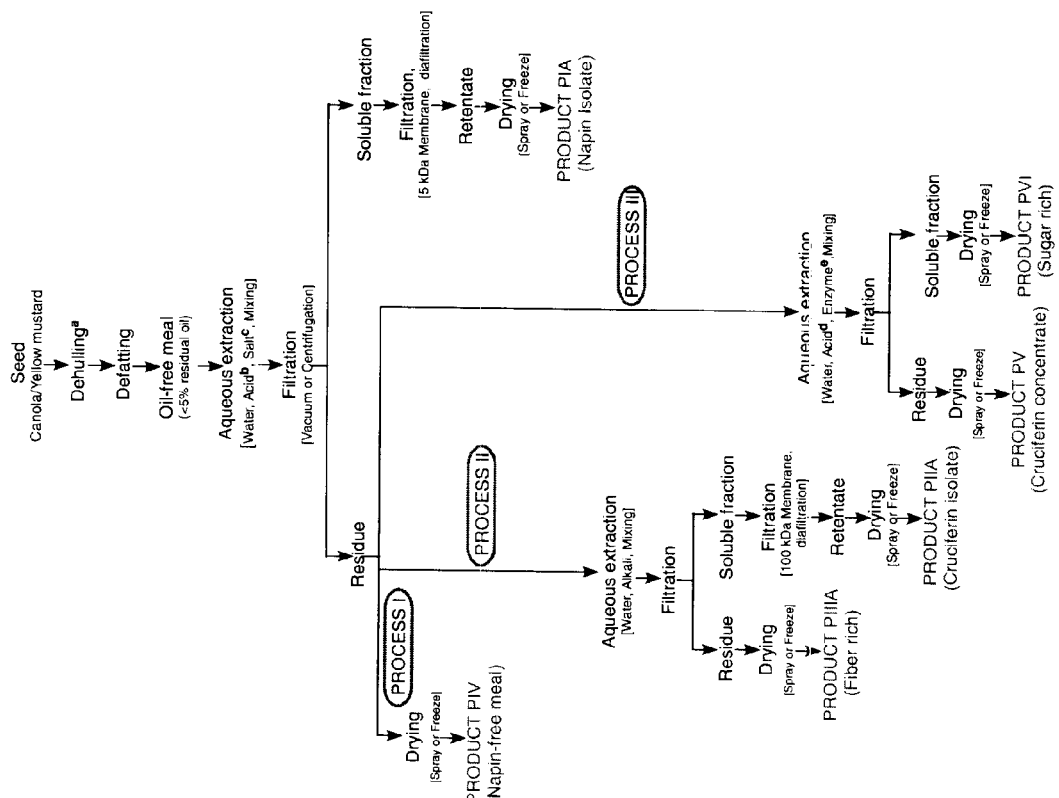

FIG. 12 shows electrophoretic profiles of *Sinapis alba* meal extract and remaining residue, obtaining using citrate/Na at ph 5.1, pH 4.1 and pH 3.1. Right (unlabelled) lanes: molecular weight markers; A: S—S bonds reduced; B: non-reduced FIG. 13 shows a schematic representation of process steps (Process I, Process II and Process III) of a further embodiment of the process of the present invention. Product IA (PIA): napin-rich protein extract; Product IIA (PIIA): cruciferin-rich protein extract; Product IIIA (MA): fibre-rich residue; Product IV (PIV): napin-free meal; Product V (PV): cruciferin concentrate; Product VI (PVI): sugar rich product. $^a$: step may not be needed, recommended for yellow mustard; $^b$: HCL or citric acid; $^c$: NaCl or Na citrate; $^d$: HCl; e: cell wall degrading enzymes.

Figure 14:
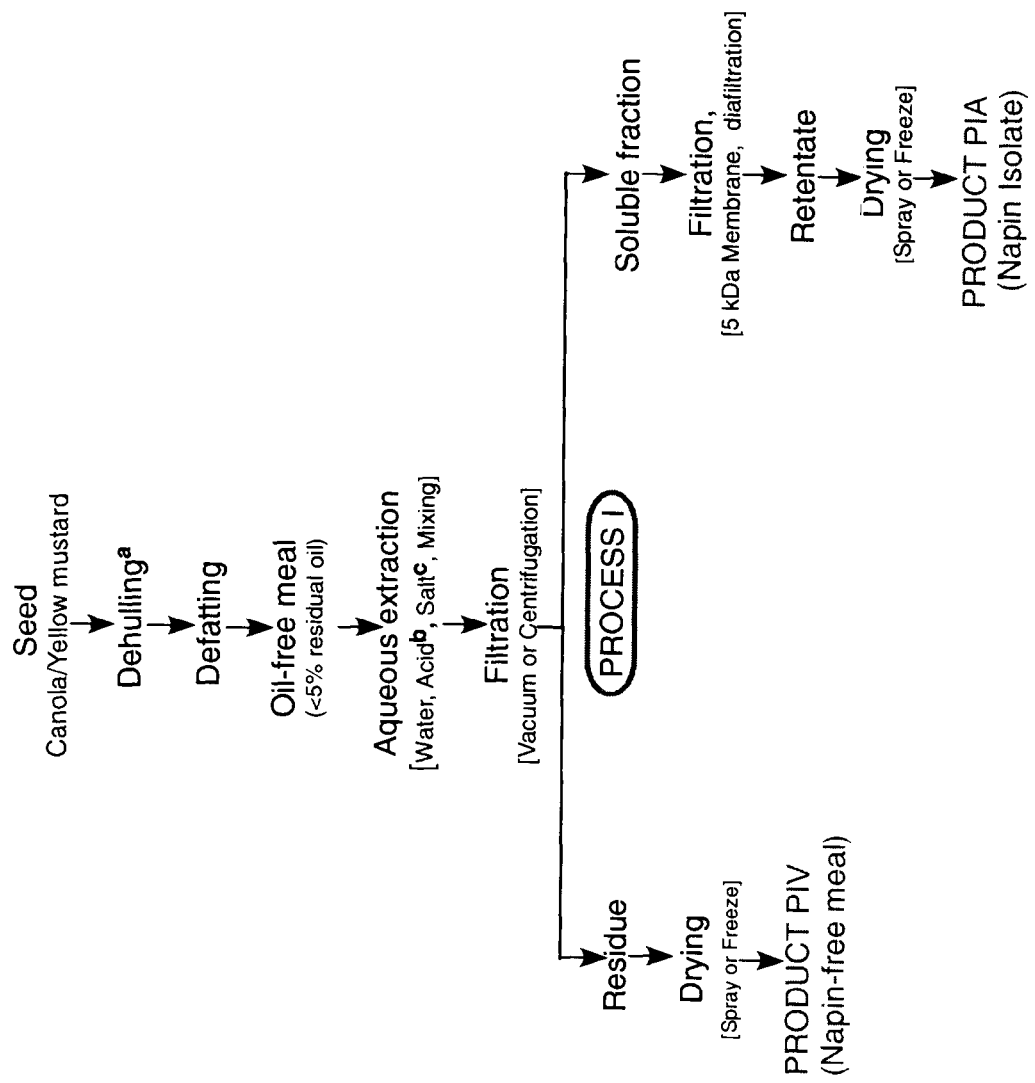

FIG. 14 shows a schematic of options for Process I. Product IA (PIA): napin-rich protein extract; Product IV (PIV): napin-free meal. $^a$: step may not be needed, recommended for yellow mustard; $^b$: HCL or citric acid; $^c$: NaCl or Na citrate.

Figure 15:
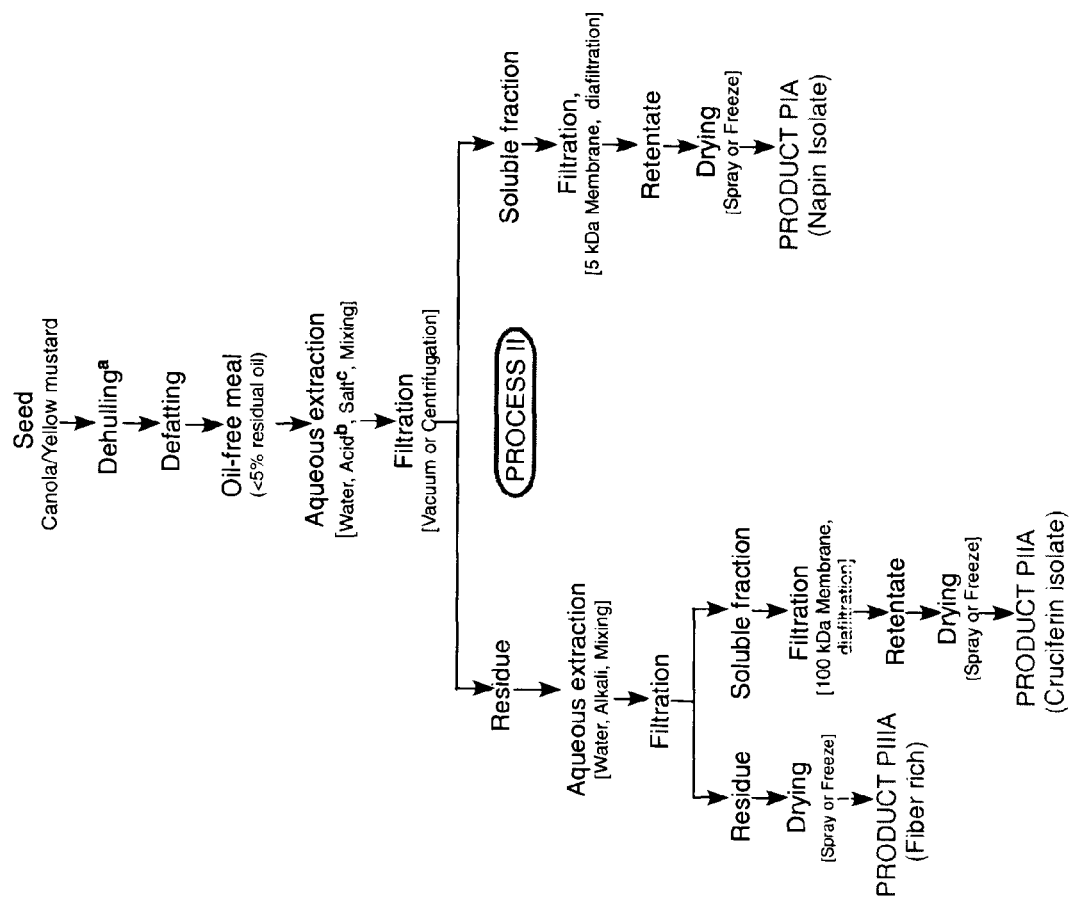

FIG. 15 shows a schematic of options for Process II. Product IA (PIA): napin-rich protein extract; Product IIA (PIIA): cruciferin-rich protein extract; Product IIIA (PIIIA): fibre-rich residue. $^a$: step may not be needed, recommended for yellow mustard; $^b$: HCL or citric acid; $^c$: NaCl or Na citrate.

Figure 16:
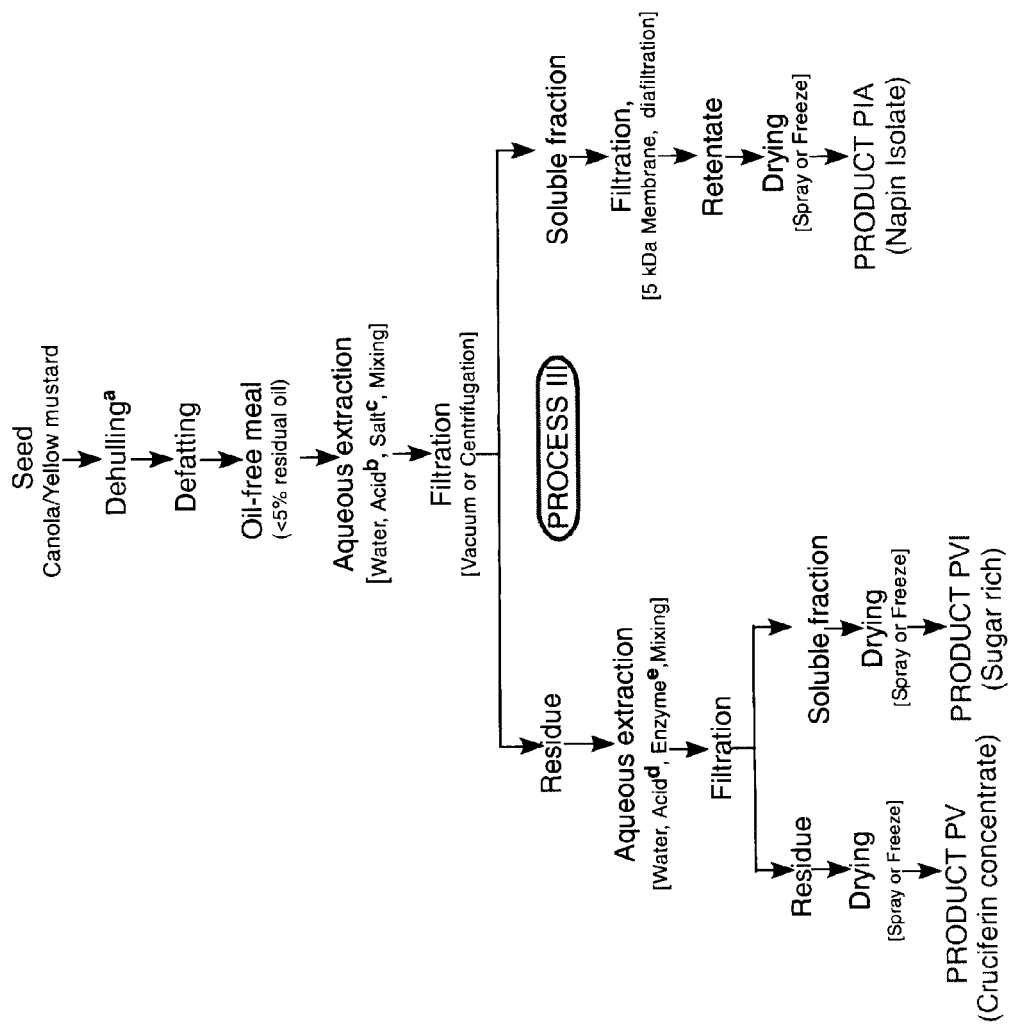

FIG. 16 shows a schematic of options for Process III. Product IA (PIA): napin-rich protein extract; Product V (PV): cruciferin concentrate; Product VI (PVI): sugar rich product. $^a$: step may not be needed, recommended for yellow mustard; $^b$: HCL or citric acid; $^c$: NaCl or Na citrate; $^d$: HCl; e: cell wall degrading enzymes.

DETAILED DESCRIPTION

The present invention relates to a process of aqueous protein extraction from Brassicaceae oilseeds and a protein extract obtained therefrom.

The following description is of a preferred embodiment.

An embodiment of the present invention provides a process of aqueous protein extraction from Brassicaceae oilseed meal to obtain a napin-rich protein extract, a cruciferin-rich protein extract that is napin-free, and a low-protein residue. The process may comprise the steps of:

performing aqueous extraction of the Brassicaceae oilseed meal at a pH of from about 2.5 to about 5.0 to obtain a soluble napin-rich protein extract and a cruciferin-rich residue; and performing aqueous extraction of the cruciferin-rich residue to obtain a soluble cruciferin-rich protein extract and a low-protein residue.

The cruciferin-rich protein extract may be substantially free of napin protein and may contain no napin protein at all. The allergenic potential of napin proteins of *S. alba* (Sin a 1) and *B. juncea* (Bra j 1) is well recognized and the European Union has listed mustard and products as ingredients containing allergenic substances. Allergenicity of napin proteins of all Brassicaceae oilseed species has not been widely studied, however the napin fraction of *B. napus* is considered as an occupational allergen. The cruciferin-rich protein extract may therefore advantageously be used for human consumption without the risk of allergenic reaction caused by the presence of napin. The aqueous extraction process of the present invention produces a fibre-rich product (product III; FIG. 10), a napin-rich product (product I; FIG. 10) and a cruciferin-rich protein extract (product II, FIG. 10) that is substantially napin-free, and the process may have advantages over known aqueous extraction processes that result in napin contaminated products.

The present invention further provides a cruciferin-rich protein extract obtained from aqueous protein extraction which is substantially napin free. The protein extract may contain no napin. The cruciferin-rich protein extract may comprise a high yield of protein, for example from about 60 to about 95% protein or any amount therebetween, such as from about 75 to about 90% protein, or 62, 64, 66, 68, 70, 72, 74, 76, 78, 80, 82, 84, 86, 88, 90, 92 and 94% protein, or any amount of protein therebetween.

The present invention therefore advantageously provides an aqueous extraction process of Brassicaceae oilseed meal that results in a high yield of cruciferin-rich protein that may be substantially free of napin protein.

By the term "substantially free" it is meant that only trace amounts, if any, of the protein is present in an extract. The amount of the protein may be determined using PAGE, or by western analysis using an appropriate antibody to detect the desired protein. For example, if the protein is napin, and the extract is a cruciferin-rich protein extract that is substantially free of napin, then the amount of napin in the cruciferin-rich protein extract is from about 0 to about 5% protein content, or any amount therebetween, for example 0-2% protein content, or any amount therebetween, 0-1% protein content, or any amount therebetween, 0-0.5% protein content, or any amount therebetween, or 0, 0.001, 0.002, 0.004, 0.006, 0.008, 0.01, 0.02, 0.04, 0.06, 0.08, 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0% protein content, or any amount therebetween.

By the term "napin-rich protein extract" it is meant that the predominant protein in the extract is napin (2S), and comprises from about 60 to about 100% of the protein content or any amount therebetween, from about 80-100% of the protein content or any amount therebetween, from about 90-100% of the protein content or any amount therebetween, or 60, 62, 64, 66, 68, 70, 72, 74, 76, 78, 80, 82, 84, 86, 88, 90, 92, 94, 96, 98, 100% of the protein content or any amount therebetween.

By the term "cruciferin-rich protein extract" and "cruciferin-rich residue" it is meant that the predominant protein in the extract or residue is cruciferin (11S), and comprises from about 60 to about 100% of the protein content or any amount therebetween, from about 70-90% of the protein content or any amount therebetween, from about 75-85% of the protein content or any amount therebetween, or 60, 62, 64, 66, 68, 70, 72, 74, 75, 76, 78, 80, 82, 84, 85, 86, 88, 90, 92, 94, 96, 98, 100% of the protein content or any amount therebetween. Preferably the cruciferin-rich protein extract is substantially free of napin and may be termed a napin-free cruciferin-rich protein extract.

By the term "low-protein residue" or "low protein fraction" it is meant that the amount of protein in the residue has low amounts of protein therein, for example but not limited to less than 40% protein, for example from about 40 to about 1% of the protein content or any amount therebetween. The low-protein fraction may be high in fibre. During the extraction process most of the low molecular weight components may be removed from this fraction and the low-protein, high-fibre residue may be used for further applications.

It has been found by the present inventors that napin proteins typically remain soluble at an acid pH range of between 2.5 and 5, while cruciferin proteins remain less soluble in this range. The napin-rich fraction may be highly soluble at low pHs and thus possesses a unique property which most commercial plant protein isolates do not have. Therefore the process of the present invention includes the step of aqueous extraction of Brassicaceae oilseed meal using an acid pH aqueous solution which generally separates the meal proteins into soluble napin proteins that remain in the aqueous protein extract and less soluble cruciferin proteins which are mainly retained in the residue (e.g. see FIGS. 12A and 12B). The napin-rich protein extract and cruciferin-rich residue may be separated by centrifugation. Aqueous extraction of the Brassicaceae oilseed meal is carried out at an acid pH of from about 2.5 to about 5.0, or any pH therebetween, such as pH 2.6, 2.7, 2.8, 2.9, 3.0, 3.1, 3.2, 3.3, 3.4, 3.5, 3.6, 3.7 3.8, 3.9, 4.0, 4.1, 4.2, 4.3, 4.4, 4.5, 4.6, 4.7, 4.8 and 4.9, or any pH therebetween, and may be carried out at a pH of about 3 to about 4.5. Any suitable acid may be used to adjust the pH of the extract in the extraction step, for example, HCl, phosphoric acid, sulfuric acid, an organic acid for example a C4, C5 or C6 organic acid for example citric acid, malic acid, oxaloacetic acid, oxoglutaric acid and the like, or a combination thereof. Preferred acids include HCL and citric acid, or a combination thereof.

For aqueous extraction, the Brassicaceae oilseed meal may be mixed with a solvent, at a meal-to-solvent ratio of from about 1:10 to about 1:90, or any ratio therebetween, for example 1:15, 1:20, 1:25, 1:30, 1:35, 1:40, 1:45, 1:50, 1:55, 1:60, 1:65, 1:70, 1:75, 1:80 and 1:85, or any ratio therebetween. The meal-to-solvent ratio may be from about 1:15 to about 1:60. The solvent may be alcohol, such as but not limited to ethanol or isopropanol. Alternatively, the solvent may be water or another aqueous solvent, with a salt (such as sodium chloride or the like) dissolved therein. The salt may be dissolved in the aqueous solvent at a concentration of from about 0.25 to about 2.0 w/v, or any amount therebetween, such as 0.3, 0.4, 0.5, 0.6, 0.7, 0.8, 0.9, 1.0, 1.1, 1.2, 1.3, 1.4, 1.5, 1.6, 1.7, 1.8 and 1.9 w/v or any concentration therebetween.

The soluble napin-rich protein extract produced as a result of aqueous extraction in the presence of a salt may be desalted to remove salt from the extract. Desalting may be carried out by filtration, such as but not limited to ultrafiltration/diafiltration.

Aqueous extraction of the Brassicaceae oilseed meal may be carried out for about 25 to about 360 minutes, or any time therebetween, such as 30, 40, 50, 60, 70, 80, 90, 100, 110, 120, 130, 140, 150, 160, 170, 180, 190, 200, 210, 220, 240, 250, 260, 280, 300, 310, 320, 330, 340 and 350 minutes or any time therebetween. The extraction may be carried out for about 60 to about 150 minutes. Aqueous extraction of the Brassicaceae oilseed meal may be carried out at a temperature of from about 18° C. to about 50° C., or any temperature inbetween, for example but not limited to 20, 22, 24, 26, 28, 30, 32, 34, 36, 38, 40, 42, 46 and 48° C., or any temperature therebetween, and may be carried out at a temperature of from about 20° C. to about 30° C.

The process may further comprise drying the napin-rich protein extract, for example, but not limited to, freeze or spray drying the napin-rich protein extract to produce a napin-rich protein powder. The napin-rich protein extract may comprise a high yield of protein, such as from about 50 to about 95% protein or any amount therebetween, such as 52, 54, 56, 58, 60, 62, 64, 66, 68, 70, 72, 74, 76, 78, 80, 82, 84, 86, 88, 90, 92 and 94% protein, or any amount therebetween, and may comprises from about 75 to about 90% protein.

Following aqueous extraction of the Brassicaceae oilseed meal into a soluble napin-rich protein extract and cruciferin-rich residue, the residue may be dried to produce a napin-free meal fraction (Product PIV) as shown in FIGS. 13 and 14 (Process I).

Alternatively, following aqueous extraction of the Brassicaceae oilseed meal into a soluble napin-rich protein extract and cruciferin-rich residue, the cruciferin-rich residue may be subjected to aqueous extraction to solubilize the cruciferin proteins in the residue (see FIGS. 10 and 13). The soluble cruciferin proteins are retained in the aqueous protein extract leaving a residue which is low in protein and typically rich in fiber, product III, FIG. 10, or product PIIIA, FIGS. 13 and 15. The cruciferin-rich protein extract and low-protein residue may be separated by centrifugation or other suitable method, for example filtration. The process for obtaining the cruciferin-rich protein extract, for example product II (FIG. 10; or PIIIA, FIGS. 13 and 15), may be carried out using an aqueous extraction at alkaline pH (Process II of FIGS. 13 and 15), or as described further below, the cruciferin-rich protein extract, for example product PV, may be obtained using an aqueous extraction under acidic conditions in the presence of a cell wall degrading enzyme (see FIGS. 13 and 16 Process III).

For the process involving an aqueous extraction at alkaline pH (Process II of FIGS. 13 and 15) to produce product II (FIG. 10) or PIIIA (FIGS. 13 and 15), the aqueous extraction of the cruciferin-rich residue may be carried out at neutral or alkali pH. The pH of the extraction may be from about 7.0 to about 13.0, or any pH therebetween, such as pH 7.2, 7.4, 7.6, 7.8, 8.0, 8.2, 8.4, 8.6, 8.8, 9.0, 9.2, 9.4, 9.6, 9.8, 10.0, 10.2, 10.4, 10.6, 10.8, 11.0, 11.2, 11.4, 11.6, 11.8, 12.0, 12.2, 12.4, 12.6, 12.8, and 13.0 or any pH therebetween. The pH of the aqueous extraction of the cruciferin-rich residue may be from about pH 8.0 to about pH 10.0.

For aqueous extraction, the cruciferin-rich residue may be mixed with a solvent, at a meal-to-solvent ratio of from about 1:10 to about 1:90, or any ratio therebetween, for example 1:15, 1:20, 1:25, 1:30, 1:35, 1:40, 1:45, 1:50, 1:55, 1:60, 1:65, 1:70, 1:75, 1:80 and 1:85, or any ratio therebetween. The meal-to-solvent ratio may be from about 1:15 to about 1:60. The solvent may be alcohol, such as but not limited to ethanol or isopropanol. Alternatively, the solvent may be an aqueous alkali solution. The aqueous alkali solution may comprise NaOH at a concentration of from about 0.02 to 0.2M NaOH, or any amount therebetween, such as 0.04, 0.06, 0.08, 0.10, 0.12, 0.14, 0.16 and 0.18M NaOH, and may be from about 0.05 to about 0.1M NaOH.

Aqueous extraction of the cruciferin-rich residue may be carried out for about 25 to about 360 minutes, or any time therebetween, such as 30, 40, 50, 60, 70, 80, 90, 100, 110, 120, 130, 140, 150, 160, 170, 180, 190, 200, 210, 220, 240, 250, 260, 280, 300, 310, 320, 330, 340 and 350 minutes or any time therebetween. The extraction may be carried out for about 60 to about 150 minutes. Aqueous extraction of the cruciferin-rich residue may be carried out at a temperature of from about 18° C. to about 50° C., or any temperature inbetween, for example but not limited to 20, 22, 24, 26, 28, 30, 32, 34, 36, 38, 40, 42, 46 and 48° C., or any temperature therebetween, and may be carried out at a temperature of from about 20° C. to about 30° C.

The soluble cruciferin-rich protein extract may be purified by filtration, such as but not limited to ultrafiltration/diafiltration. The purified filtrate may be dried, for example, but not limited to, freeze drying or spray drying, to produce a cruciferin-rich protein powder. The cruciferin-rich protein extract may comprise a high yield of protein, for example from about 60 to about 95% protein, or any amount therebetween, such as 62, 64, 66, 68, 70, 72, 74, 76, 78, 80, 82, 84, 86, 88, 90, 92 and 94% protein, or any amount of protein therebetween. The cruciferin-rich protein extraction may comprise from about 75 to about 90% protein.

The low-protein residue may also be dried, for example, but not limited to Spray or freeze drying. The low-protein residue may comprise from about 1 to about 40% protein, or any amount therebetween, for example, 2, 4, 6, 8, 10, 12, 14, 16, 18, 20, 22, 24, 26, 28, 30, 32, 34, 36 and 38% protein, or any amount therebetween. The low-protein residue may be rich in fibre.

The napin-rich protein extract, the cruciferin-rich protein extract and the fiber residue may comprise from about 50 to about 95% of total Brassicaceae oilseed meal protein, or any amount therebetween, such as 52, 54, 56, 58, 60, 62, 64, 66, 68, 70, 72, 74, 78, 80, 82, 84, 86, 88, 90, 92 and 94% of the total Brassicaceae oilseed meal protein.

Figure 1B:
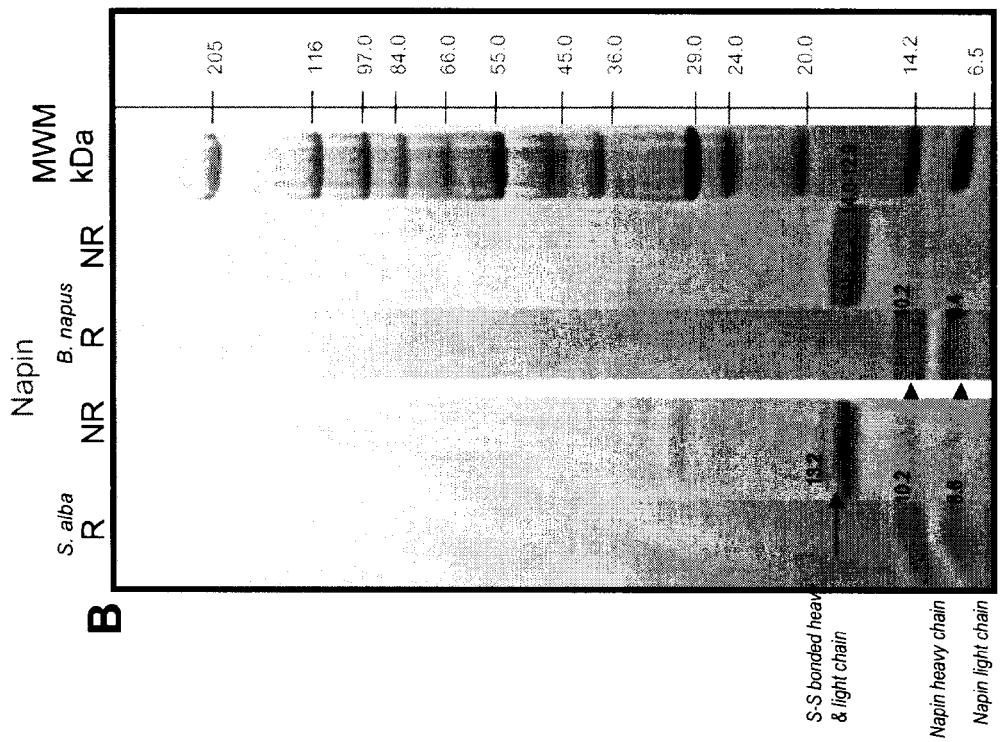
FIG. 1B shows a SDS-PAGE separation of purified napin obtained from *B. napus* and *S. alba* meals by chromatographic separation and purification (Bérot et al., 2005). Lane R: reducing conditions; Lane NR: non-reducing conditions; Lane MWM: molecular weight markers.
Figure 1A:
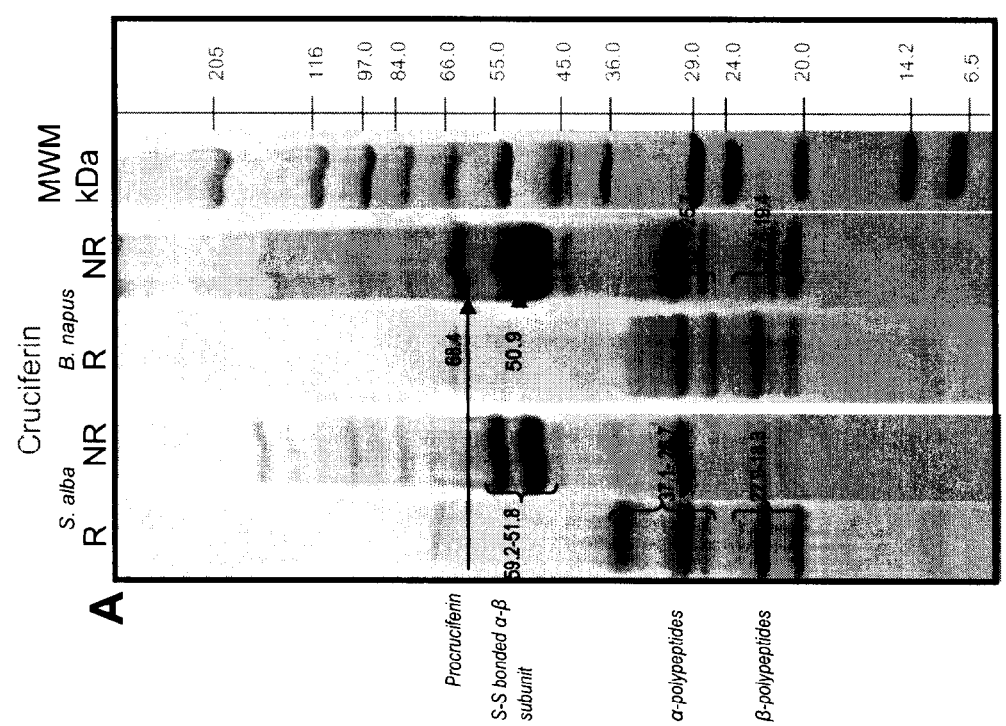
FIG. 1A shows a SDS-PAGE separation of purified cruciferin obtained from *B. napus* and *S. alba* meals by chromatographic separation and purification (Bérot et al. 2005). Lane R: reducing conditions; Lane NR: non-reducing conditions; Lane MWM: molecular weight markers.
Figure 2:
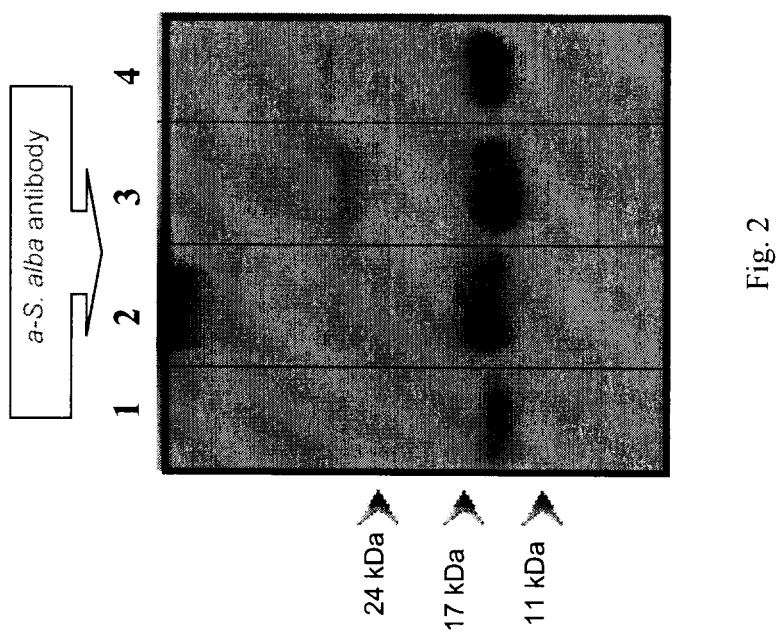
FIG. 2 shows a western blot with napin polyclonal antibodies. Lane 1: *S. alba* purified napin; Lane 2: partially purified *S. alba* seed extract; Lane 3: *B. napus* seed extract; Lane 4: *S. alba* seed extract.

In the Examples disclosed herein, purified cruciferin and napin of *B. napus* and *S. alba* obtained through Bérot et al. (2005) procedure were used as standards of cruciferin and napin. Chromatographic separation of cruciferin and napin was a four-step column separation process and included several dialysis and drying steps as intermediate steps. Although the proteins were of a high degree of purity, the yield of protein recovery was low. Upon SDS-PAGE separation under reducing or non-reducing conditions cruciferin and napins separated into polypeptide bands without interfering with each other (FIGS. 1A and 1B). Developed napin antibodies further confirmed the identity of napins (FIG. 2).

Figure 3:
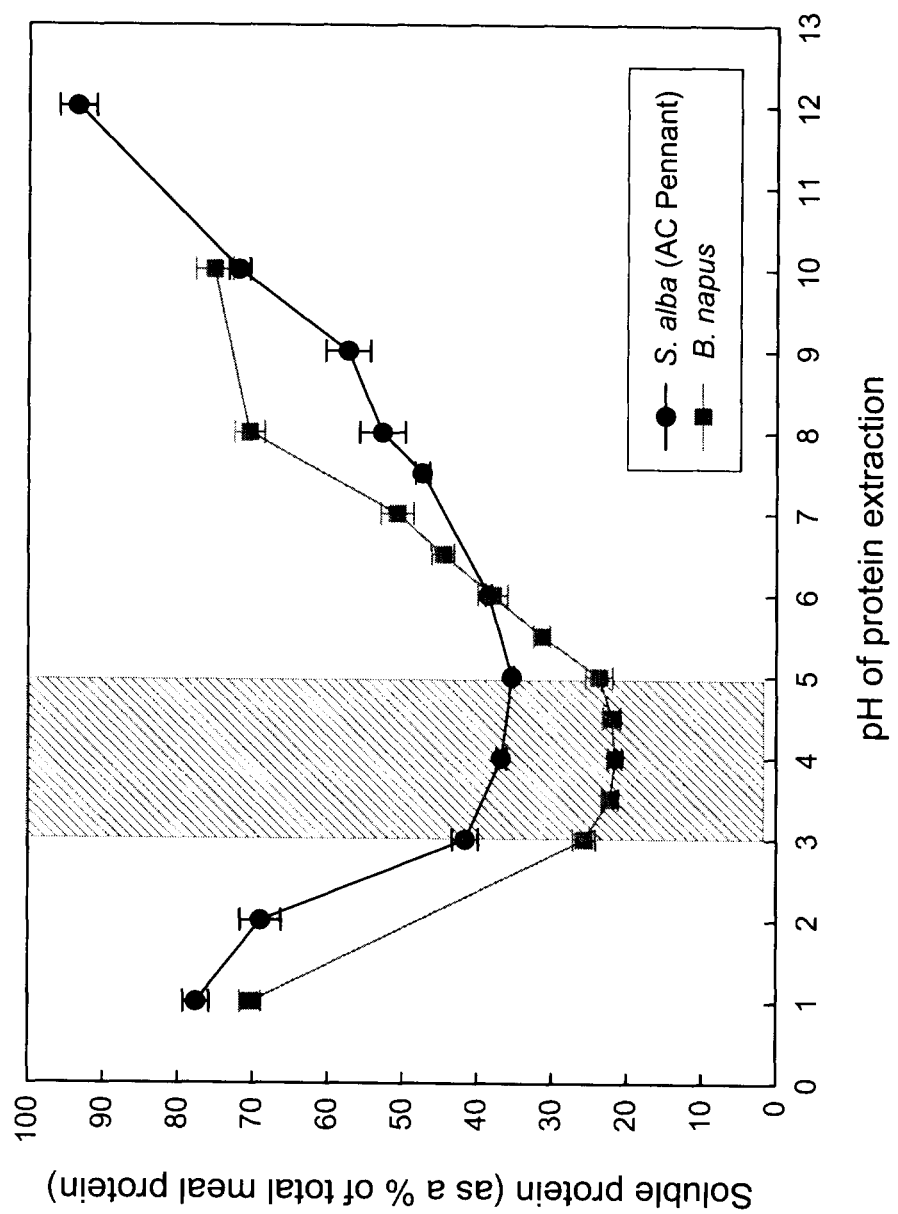
FIG. 3 shows solubility behaviour of proteins of *B. napus* and *S. alba* dehulled and defatted meal as a function of pH.
Figures 4A, 4B:
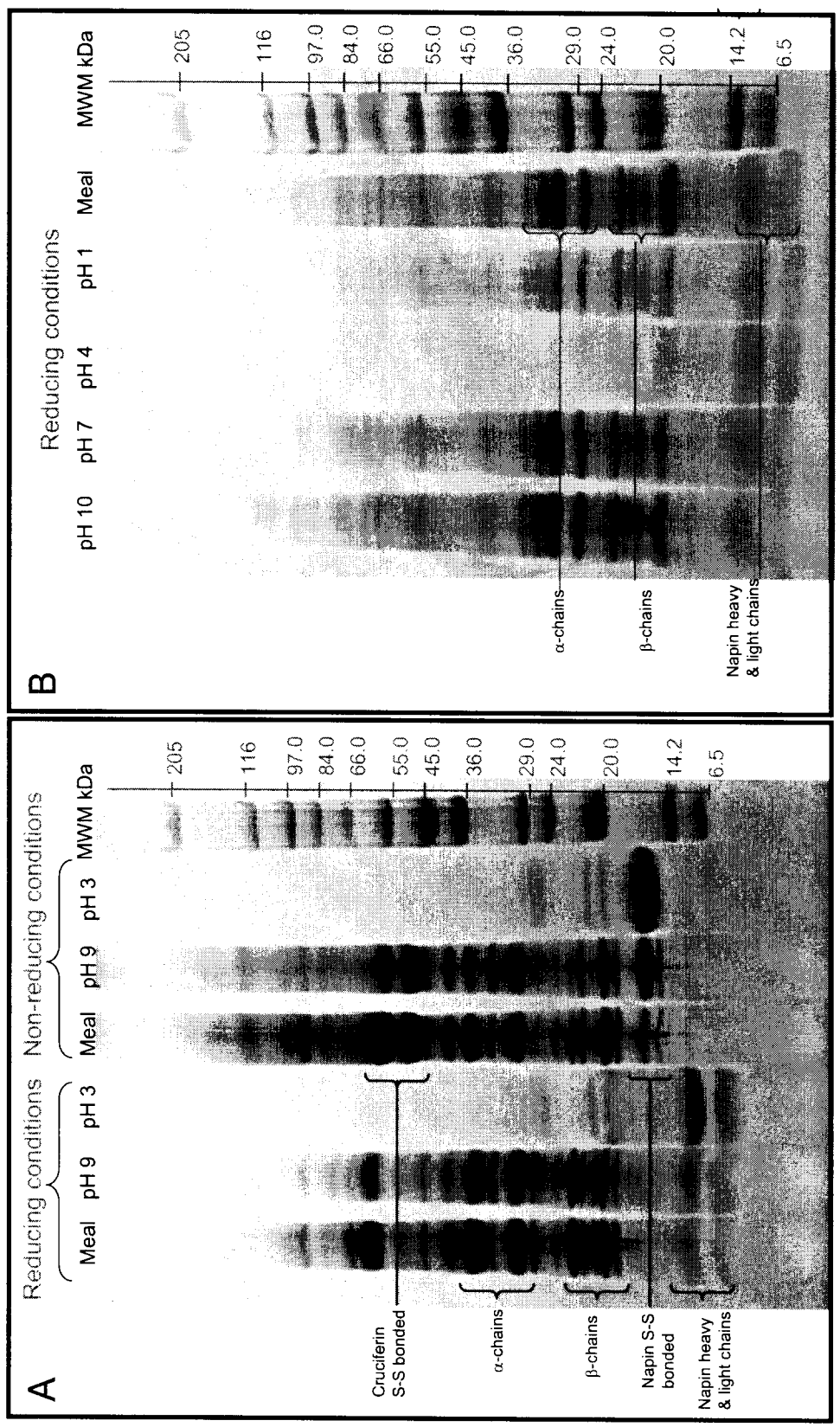
FIG. 4A shows a SDS-PAGE separation of *S. alba* meal and of soluble proteins of *S. alba* meal at pH 3 and pH 9 under reducing and non-reducing conditions.
FIG. 4B shows a SDS-PAGE separation of *B.*

In order to remove or recover cruciferins and napins from the seed matrix, the protein solubility behaviour and soluble protein types of *B. napus* and *S. alba* as pH of the extraction medium changes was investigated. It was found that cruciferin and napin of *B. napus* and *S. alba* have obviously different pH based solubility behaviour (FIGS. 3, 4A and 4B). This solubility difference of napin and cruciferin was exploited to develop a process to separate these two proteins.

From the results of Example 2, it is evident that between pH 3.0 and 5 mostly napins and not cruciferins get solubilized. Extraction conditions were further investigated to determine the best meal-to-solvent ratio, extraction time and extraction temperature to recover the maximum amount of napin with minimum non-napin protein contamination at pH 4.5. It was found that protein extractability at pH 4.5 increased with increasing extraction temperature and amount of solvent fraction available to solubilise (FIG. 5). However these conditions did not provide selective extraction of napin non-napin proteins come into solution at higher pH.

Other conditions that improve selective solubility of napin protein were examined, such as inclusion of NaCl or food grade alcohols such as ethanol or isopropanol in the extraction medium. It was found that use of NaCl at 0.75% (w/v) or ethanol at 80% (v/v) may improve selective extraction of napin at pH 3.0 and 4.5, respectively (FIGS. 6A-6C). Using these extraction conditions napins may be recovered from *S. alba* and *B. napus* meal leaving behind napin-depleted residue enriched in other proteins primarily cruciferin.

The remaining meal residue which is depleted in napin mainly contains cruciferin and is a suitable substrate to obtain napin-free cruciferin. The optimum conditions to recover cruciferins from cruciferin-rich residue were investigated. It was found that cruciferins in the cruciferin-rich residue can be extracted at basic pH or alkaline conditions, as shown in FIGS. 6A-6C and Table 2; an extraction pH of 9.0 was very effective in solubilising cruciferin from the meal.

The Examples showed that selective solubilisation of napin and cruciferin from *B. napus* and *S. alba* meals can be facilitated by choosing extraction conditions. By combining these extraction conditions and sequences a process was developed to obtain cruciferin and napin separately from *B. napus* and *S. alba* meals. This process is schematically represented in FIGS. 9, 10, and 13-16.

The process has several advantages as follows. The process employs simple and regularly used unit operations in processing plants, uses minimal chemical input (acid, alkali and NaCl) and provides a minimum of three usable products in which two are high in protein. Unit operations required in the protein extraction process are simple agitation, centrifugation, filtering, membrane separation, and drying. The process does not produce environmentally hazardous waste or by-products. The protein rich products contain polypeptides primarily originating from one group of proteins, either cruciferin (11S) or napin (2S). The cruciferin-rich fraction has 79 to 82% protein and is the comparatively larger material fraction. This product may be substantially free of napin and will be soluble at neutral to alkali pHs. When mustard is used as the starting material this protein fraction is free of potentially allergenic proteins. Allergenicity of 2S proteins of all *Brassica* oilseed species has not been widely studied, however 2S fraction of *B. napus* is considered as an occupational allergen (Monslave et al. 1997). Therefore availability of 2S free protein product may have advantage over 2S contaminated products. The napin-rich fraction contains ~90% protein and is highly soluble at low pHs and thus possesses a unique property which most commercial plant protein isolates do not have. The protein-low fraction may be high in fibre. During the extraction process most of the low molecular weight components have been removed from this fraction. This fibre-rich fraction may be utilized for its own application. The process steps when continued in sequence provide three distinctly different protein containing products; napin-rich (89 to 93% protein), cruciferin-rich (79 to 82% protein) and protein-low (4 to 33%) products.

Therefore, the present invention provides a napin-free, cruciferin-rich protein product comprising 11S protein from 60 to 100% protein content, and from 0 to about 10% napin (2S) protein content, of the cruciferin-rich protein product, the napin-free, cruciferin-rich protein product obtained from a Brassicaceae oilseed.

Example 7 shows napin and cruciferin separation from commercial canola meal using the protein extraction process. The protein content of the commercial canola meal was low compared to laboratory prepared *B. napus* meal. Commercial meal contains seed coats (hulls), which may have contributed to this low value. Therefore, it may be desired to remove the hull of the seed prior to extraction as described herein.

Brassicaceae oilseeds may be separated into hulls and cotyledons (meat) by dehulling, for example, but not limited to a process of cracking the seeds in a stone mill. The hulls can be further processed, for example to obtain mucilage (e.g. when using yellow mustard) which is a food-grade hydrocolloid. The cotyledons may be defatted to produce defatted meal. This dehulled and defatted meal may be used as the starting product for the aqueous extraction. Dehulled and defatted meal has the advantage that there is less interference from polysaccharides for protein extraction and recovery. Another source that can be used as a starting material for the extraction processes described herein, to produce a cruciferin-rich product (and a napin-rich product and a napin-free meal) includes yellow mustard (*Sinapus alaba*) flour.

The present invention therefore further provides a process of aqueous protein extraction of Brassicaceae oilseeds to obtain a napin-rich protein extract, a cruciferin-rich protein extract, and a low-protein residue, the process comprising the steps of:

dehulling the Brassicaceae oilseeds to separate Brassicaceae oilseed cotyledons from Brassicaceae oilseed hulls;

defatting the Brassicaceae oilseed cotyledons to obtain defatted Brassicaceae oilseed meal;

performing aqueous extraction of the Brassicaceae oilseed meal at a pH of from about 2.5 to about 5.0 to obtain a soluble napin-rich protein extract and a cruciferin-rich residue; and performing aqueous extraction of the cruciferin-rich residue to obtain a soluble cruciferin-rich protein extract and a low-protein residue.

The protein fractionation process developed using laboratory prepared *Sinapis alba* and *Brassica napus* meal can be applied to commercial canola meal. Because of the process conditions that the protein has been subjected to during the oil recovery process less amount of protein was partitioned as napin and cruciferin in this process (Example 7).

As described above, following aqueous extraction of the Brassicaceae oilseed meal into a soluble napin-rich protein extract and cruciferin-rich residue, the cruciferin-rich residue is subjected to aqueous extraction to solubilize the cruciferin proteins in the residue (see FIGS. 10 and 13). The process for obtaining the cruciferin-rich protein extract (for example product II; FIG. 10; or PIIIA, FIGS. 13 and 15), may be carried out using an aqueous extraction at alkaline pH (Process II of FIGS. 13 and 15), or as described below, the cruciferin-rich protein extract, for example product PV, may be obtained using an aqueous extraction under acidic conditions in the presence of a cell wall degrading enzyme (see FIGS. 13 and 16; Process III) as described in Examples 9 and 10.

Cruciferin may also be recovered from the cellular matrix using enzymes that degrade the cell wall. Without wishing to be bound by theory, cell wall polysaccharides may become partially solubilized under alkaline conditions and consequently concentrated with proteins as a retentate of the membrane separation step.

Pretreatment of canola seed flakes with polysaccharide degrading enzymes of *Aspergillus niger* has been shown to reduce oil extraction time and enhanced oil yield (Sosulski et al., 1988, *J. American Oil Chemists' Society*. 65: 357-361). Pretreatment of buckwheat bran with cellulase, pectinase and hemicullases improved alkali soluble nitrogen content (Grossman et al. (1980, *J. Food Biochemistry* 4: 181-188. Ansharullah et al., (1997, *J. Science Food and Agriculture*. 74, 141-146) used VISCOZYME and CELLUCAST to pretreat rice bran and as a result the solubility of proteins in the bran was enhanced. However, use of cell wall polysaccharide degrading enzymes has not been employed to concentrate proteins in oilseed cotyledons.

In the methods described in Examples 9 and 10 (FIGS. 13-16), napin-free meal residue from an initial aqueous extraction at low pH which may include the presence of a mineral salt as previously described, undergoes a second low pH extraction (Process III) from about pH 3 to 4.5, or any pH therebetween, for example pH 3.0, 3.2, 3.4, 3.6, 3.8, 4.0, 4.2, 4.4, 4.5, or any pH therebetween, in the presence of cell wall degrading enzymes at a temperatures from about 35 to about 60° C., or any temperature therebetween, for example 40-50° C., or any temperature therebetween, or 35, 36, 38, 40, 42, 44, 46, 48, 50, 52, 54, 56, 58, 60° C., or any temperature therebetween. Non limiting examples of cell wall degrading enzymes include a mixture of cellulases, hemicellulases and xylanses, and may include additional enzymes for example, arabinase, beta-glucosidase, carbohydrase galactanase, glucanase, mannose, carrageenase, agarase, α-amylase, dextrinase, pullulanase, glucoamylase, pectinase, and a combination thereof. An example of a suitable enzyme mixture that is commercially available is VISCOZYME. Under these conditions, cruciferin remains insoluble, cell wall polysaccharides are depolymerized and become soluble. The soluble components of the extraction are removed using methods described above (for example filtration) and can be discarded or concentrated, for example by drying, to obtain sugars and oligosaccharides. Remaining residue (after adjusting pH to 7.0) is dried to produce cruciferin-rich protein product (PV) of about 60 to about 85% protein content, or any amount therebetween, for example 65-70% protein content, or any amount therebetween, for example 60, 62, 64, 66, 68, 70, 72, 74, 76, 78, 80, 82, 84, 85% protein content or any amount therebetween. The cruciferin-rich residue may be further washed with ethanol for example at 70%, (v/v) to solubilize additional depolymerized polysaccharides and increase protein content to about 75-90% or any amount therebetween, for example 80-90% or any amount therebetween, for example a protein content of 75, 76, 78, 80, 82, 84, 86, 88, 90%, or any amount therebetween.

Therefore the present invention also provides a process of aqueous protein extraction from Brassicaceae oilseed meal to obtain a napin-rich protein extract, a cruciferin-rich protein extract, and optionally, a sugar rich fraction. The process comprises the steps of:

Performing a first aqueous extraction of the Brassicaceae oilseed meal at a pH of from about 2.5 to about 5.0 to obtain a soluble napin-rich protein extract and a cruciferin-rich residue; and performing a second aqueous extraction of the cruciferin-rich residue at a pH of from about 3.0 to about 4.5 in the presence of one or more cell wall degrading enzymes and separating the cruciferin-rich protein extract from a sugar rich fraction.

The process described above may also involve in the step of performing a second aqueous extraction, a temperature from about 40 to about 60° C.

The present invention will be further illustrated in the following examples.

EXAMPLES

Material Preparation

Seeds of *Sinapis alba* (mustard seeds) (AC Pennant and Andante) from breeding trials of Saskatoon Research Centre and *Brassica napus* (canola seeds) from Cargill, Canada (Variety unknown) were used. First seeds were screened through #10, #12, #14, and #16 sieves (Tyler, Mentor, Ohio) to segregate into sizes. The segregated seeds were then frozen to −70° C. and cracked in a stone mill (Morehouse Cowles, Chino, Calif.). The seed cracking space of the mill was adjusted according to the seed size thus seed segregation as first step helped to minimize un-cracked seeds. Use of frozen seeds minimized the amount of fine particles and oil leakage during cracking. Cracked seed material was air classified using a seed cleaner (Agriculex). This process successfully separated mustard and canola seeds into hulls and cotyledons (meats). *S. alba* seed was always used as dehulled. The objective of mustard dehulling was twofold; hulls can be further processed to obtain mucilage which is a food-grade hydrocolloid (currently in use) and the dehulled meal has less interference from polysaccharides for protein extraction and recovery.

Defatting of cotyledons was performed in two stages, first through a laboratory screw press (6 mm disc, motor setting at 8) and then with hexane extraction of pressed meal using a laboratory soxhlet extraction unit. Dehulled and defatted meal was air dried and ground with a coffee grinder to pass through #40 (425 μm, Tyler, Mentor, Ohio) mesh screen and stored in airtight containers at 4° C. until use. The meal so obtained has <3% residual oil content on dry weight basis.

Chemical Analyses and Chromatographic Separation

Protein Content of Seed Meals, Protein Extracts and Protein Fractions:

Total nitrogen content of the meals was determined by combustion N analysis and/or Kjeldahl N analysis (AOCS, 1990) and then converted to protein content using 6.25 as the conversion factor. When extracts are in liquid form, and of a low protein content, soluble protein content was determined using Modified Lowry procedure as described by Lindeboom and Wanasundara (2007) essentially using a micro-titer plate reader.

Separation and Purification of Cruciferin and Napin:

To obtain highly purified 11S (cruciferins) and 2S (napins) of *B. napus* and *S. alba* chromatographic separation and purification described by Bérot et al. (2005) was employed with minor modifications. Proteins were extracted by dispersing the meal in 50 mM Tris-HCl buffer (1:10, w:v), pH 8.5, containing 750 mM NaCl, 5 mM EDTA and 28 mM sodium bisulphite, mixed for 1 h and then centrifuged for 10 min at 15,000×g. The pellet was re-extracted under the same conditions. The supernatants of the two extraction steps were combined and filtered through a Whatman no. 1 filter paper.

The first step of protein separation was to remove phenolics and other small molecules from the extract using size exclusion chromatography (SEC; Sephadex G-25, mobile phase 50 mM Tris-HCl pH 8.5, 1M NaCl). An ÄKTA Explorer system (Amersham Pharmacia, Uppsala, Sweden) was used for all the chromatographic separation and the protein was monitored as UV absorbance at 280 nm. Protein fraction collected from SEC was dialyzed against distilled water and freeze dried before further separation. Cation exchange chromatography (CEC; Resource S, mobile phase A: 50 mM Tris-HCl pH 8.5, 5 mM EDTA, 0.3% $NaHSO_3$, B; 50 mM Tris-HCl pH 8.5 containing 1M NaCl) was employed to obtain crude fractions of cruciferin and napin. The first protein fraction that eluted from the CEC was cruciferin and further purification of this fraction was obtained by SEC (Sephacryl S-300, Mobile phase 50 mM Tris-HCl pH 8.5 containing 1M NaCl). The napin fraction that was eluted from the CEC at high NaCl concentration (>60%) was further cleaned using hydrophobic interaction chromatography (HIC; Phenyl Sepharose 6, mobile phase buffer A; 50 mM Tris-HCl pH 8.5, B; 50 mM Tris-HCl pH 8.5 containing 0.85M $Na_2SO_4$) Both cruciferin and napin fractions were dialyzed and freeze dried. The cruciferin and napin so obtained was utilized as reference standards in electrophoresis separation and for napin-antibody preparation.

Sodium Dodecylsulfate-Polyacrylamide Gel Electrophoresis (SDS-PAGE) of Proteins:

Seed meals, protein extracts, purified proteins and protein fractions were prepared according to Laemmli procedure (Laemmli, 1970) for SDS-PAGE separation. When non-reducing conditions were required β-mercaptoethanol (β-ME) was not included in the sample buffer. Gradient mini gels (resolving 8-25% T and 2% C, stacking zone 4.5% T and 3% C, 43×50×0.45 mm, polyacrylamide gels cast on GelBond® plastic backing, buffer 0.112M acetate, 0.112M Tris, pH 6.4) were used to separate proteins on a PhastSystem equipped with separation and development capabilities (Amersham Pharmacia, Uppsala, Sweden). Samples of ~1 μg protein were applied into each well and standard proteins were also applied into a separate well. The molecular weight standard (Sigma wide range molecular weight markers) consisted of the following proteins; rabbit muscle myosin (205 kDa), *E. coli* β-glucosidase (116 kDa) rabbit muscle phosphorylase-b (97 kDa), rabbit muscle fructose-6-phosphate (84 kDa), bovine serum albumin (66 kDa) bovine liver glutamic dehydrogenase (55 kDa), chicken egg ovalbumin (45 kDa), rabbit muscle glyceraldehydes-3-phosphate (36 kDa), bovine erythrocytes carbonic anhydrase (29 kDa), bovine pancrease trypsinogen (24 kDa), soybean trypsin inhibitor (20 kDa), bovine milk α-lactalbumin (14.2 kDa) and bovine lung aprotinin (6.5 kDa). Electrophoresis conditions were 250 V, 10 mA throughout at 15° C., and 20 min running time. Running buffer contained 0.2M Tricine, 0.2M Tris and 0.55% (w/v) SDS and was at pH 8.1. Following separation, the proteins were fixed and stained using PhastGel blue R (Coomasie R-350) and developed to obtain suitable background colour. The gels were scanned and the acquired images were analyzed by the Image Master® (version 3.0, Pharmacia Biotech) software.

Napin Antibody Preparation:

Purified napin was administered to rabbits using approved animal care protocols of University of Saskatchewan. Napin-antibody containing blood was processed to obtain serum enriched with napin antibodies, which was further purified to obtain napin-polyclonal antibodies. Presence of napin in the protein extracts and fractions were further confirmed using these antibodies and western blotting technique.

Example 1

Separation, Purification and Electrophoresis Based Peptide Profiling of Cruciferin and Napin from *B. Napus* and *S. Alba*

Seed meals of *B. napus* and *S. alba* were utilized to extract, separate and purify cruciferin and napin according to the chromatographic separation method of Bérot et al. (2005) with minor modifications as described above. Purified dry proteins were reconstituted in super-Q water to have known concentration of protein and separated by SDS-PAGE.

Napin polyclonal antibodies prepared using the method disclosed above were purified and used to recognize napins in protein extracts by western blotting technique.

Electrophoresis separation of purified cruciferin and napin is provided in FIGS. 1A and 1B.

As shown in FIG. 1A, cruciferins of both species were separated into polypeptide bands that are distributed within molecular mass range of 69 to 18 kDa under non-reducing conditions. Cruciferins of Brassicaceae are expressed by multigene families (Breen and Crouch, 1992; Sjodahl et al. 1991) thus several isoforms and variants of cruciferin subunits are expected. According to protein databases (UniProt, Swiss-Prot) description of 5 different *B. napus* cruciferins are available. They are; cruciferin, cruciferin CRU4, cruciferin CRU1, cruciferin CRU2 and cruciferin BnC1, encoded by CRUA (syn. CRU2/3), CRU4, CRU1, BnC2 and BnC1 genes, respectively. These are actually the polypeptides that form the subunit (protomer) of the 11S globulin. It is common to find unprocessed cruciferin (procruciferin) which may be represented by several bands above 60 kDa. The two intensely stained bands between 60 to 45 kDa may represent the disulfide bonded α-β (acidic-basic) polypeptides or subunits. Presence of free a and/or β polypeptides is common in Brassicaceae plants (Inquello et al 1993). The stained bands between 35 to 20 kDa present in non-reducing gels may be from such free polypeptides. Upon disulfide bond reduction the intensity of protein bands in the range between 40-18 kDa increased while the bands between 60 to 45 kDa became faint. This indicated that cleavage of α-β subunits into respective free α- and β-polypeptides.

As shown in FIG. 1B purified napin of both species separated into one or two polypeptide bands having molecular mass between 15-12.0 kDa. Napins are also codified by multigenic families and give rise to multiple napin isoforms in the seed (Monslave et al. 1991; Murén et al. 1996. Disulfide bond cleavage resulted in two clearly distinguished polypeptide bands having 10.2 kDa and 8.6 to 8.4 kDa (FIG. 1). Napin is composed of heavy (long) and light (short) polypeptide chains (one each) that are S—S bonded (2 inter- and 2 intra-chain) (Gehrig and Biemann, 1996).

It is clear from this separation that polypeptide bands of napin can be clearly distinguished from polypeptides resulting from cruciferin on SDS-PAGE separation. The antibodies developed against *B. napus* and *S. alba* napin were able to capture and confirm napins of respective species (FIG. 2).

Example 2

Solubility Differentiation of Proteins According to pH

A series of *B. napus* and *S. alba* seed meal dispersions (50 ml of 0.25%, w/v) in super-Q water were prepared at different pH values in the range of pH 1.0 to 12.0. The pH of these slurries was adjusted using HCl or NaOH (0.1M, 1M or 6M as appropriate) while stirring continuously at room temperature (22° C.). Extraction of soluble protein was accomplished by stirring the dispersion on a magnetic stirrer at room temperature for 30 minutes and maintaining the pH at the desired value. The extraction step was terminated by separating insoluble materials by centrifugation (10,000×g, 15 min, 20° C.). The supernatant was filtered to remove floating particles using a Whatman #1 filter paper under vacuum. The soluble protein content of the extract was determined using Modified Lowry assay as disclosed above. Soluble protein at each pH was calculated as a percentage fraction of total meal protein (% N×6.25) and plotted against extraction pH. Polypeptide profiles of the extracts were obtained by SDS-PAGE under reducing and non-reducing conditions.

Seed proteins of both *B. napus* and *S. alba* followed a "U" shape curve (FIG. 3) for the content of soluble proteins when plotted against pH of the extraction medium which is typical for most dicot seed storage proteins. It is noticeable that minimum solubility for both these seed types occurred between pH 3 and 5. At this minimum solubility pH a considerable fraction of proteins were soluble; ~20% of *B. napus* and ~40% of *S. alba* total meal proteins. Soluble protein content reached above 70% in extreme acidic and basic pHs.

As shown by SDS-PAGE separation of soluble proteins (FIGS. 4A and 4B), napins (2S albumins) remained soluble at pH 3.0 while cruciferins (11S globulins) were least soluble. Extractions carried out below and above this minimum solubility pH brought a significant fraction of cruciferins into soluble form.

Example 3

Extraction of Napins at Acidic pH

*S. alba* meal was used for this study. Experiments were designed to include meal-to-solvent ratio (1:20 to 1:89.5, w:v), extraction time (0.32 to 6.2 h) and temperature of extraction (15.9° C. to 46.1° C.) as independent variables. The responses or dependant variables were total soluble proteins extracted. Experiments were carried out as combinations of a Central Composite Rotatable Design and data was analysed using Response Surface Methodology (SAS, Statistical Analysis System, Release 8.2).

Meal extraction and separation of soluble protein containing liquid fraction were carried out at pH 4.5 as described in Example 2. Total protein content of the extracts was determined using modified Lowry assay. Only selected extractions based on total protein content were subjected to polypeptide profiling by SDS-PAGE.

An increase in meal-to-solvent ratio and temperature, increased the protein content that was solubilised (FIG. 5). According to data obtained, 53% of protein can be extracted when S. alba meal was dispersed at a meal-to-solvent ratio of 1:70 (w:v) and extracted at 40° C. for 5 h which was the maximum value obtained in this experimental region. When polypeptide profiles of soluble proteins were examined both napin and cruciferin become soluble if the temperature or meal-to-solvent ratio increased (FIG. 5). This means although more protein can be recovered at extraction conditions of high temperature or high meal-to-solvent ratio the extracts may contain some 11S protein. These conditions may reduce the amount of 11S protein in the remaining meal. The conditions that provide maximum total protein recovery may not selectively extract napin. Protein profile may therefore be a more important consideration than the total protein content when considering conditions for napin solubility.

Example 4

Enhancement of Napin Extraction Under Low pH

Use of alcohol (ethanol and isopropanol) at different concentrations (10 to 80%, v/v) or NaCl (0.25 to 2.00% w/v) was studied for selective solubility of napins.

For alcohol containing extractions, meals were dispersed in aqueous ethanol or isopropanol (10 to 80%, v/v) at meal-to-solvent ratio of 1:80 (w:v) and extracted for 2 h at 22° C. Extraction was continued without pH adjustment. Only selected alcohol concentrations (70 and 80%, v/v) were studied for low pH extractions. Since pH 3.0 gave darker colour in some extractions, all alcohol extractions were carried out at pH 4.5. Supernatants containing protein and solvent residues were removed by rotary evaporation. The meal residue of low pH extraction with 80% (v/v) ethanol and 30% (v/v) IPA was further extracted at pH 9 (super-Q water with pH adjustment using 1M NaOH). Similar conditions as low pH extraction were employed for the meal residue extraction.

For NaCl containing extractions, the meal was first dispersed with super-Q water (1:80, w:v) and pH was adjusted to 3.0. Then NaCl was added to bring the whole slurry to a desired NaCl concentration (0.25 to 2.0%, w/v). Extraction was continued for 2 h at 22° C., while mixing. Solubilised proteins were recovered as supernatant from centrifugation and further cleaned by filtration as described in previous sections. NaCl in the extracts was removed using a desalting column (HiPrep 26/10) on ÅKTA chromatography system. Remaining meal after low pH extraction was further extracted at high pH (pH 12.5).

Polypeptide profiling of extracts was carried out to detect extractable napin and cruciferin. S. alba meal was studied for all experiment points and B. napus meal used in validating experiments. An optimization study was designed by using 0.75% (w/v) NaCl extraction at pH 3.0 and 22° C. to determine the best meal-to-solvent ratio (experimental range 1:9.7 to 1:90.3, w:v) and extraction time (experimental range 28.5 to 136.5 min). In all these experiments, the amount of total protein extracted and polypeptide profiles of extract and remaining meal was analysed.

Table 1 provides a summary of results obtained for this study. An increase in ethanol or isopropanol (IPA) concentration in the extraction medium improved protein extraction. However that increase was not selective for napins. At 30% (v/v) IPA level mostly napin was recovered in the extract which was pronounced in low pH extraction but without improving the protein recovery yield. Among the ethanol concentrations employed only 70% (v/v) and 80% (v/v) levels were able to give selective extraction of napin. At low pH extraction only 80% (v/v) concentration gave selective solubilisation.

TABLE 1

Effect of ethanol, isopropanol, and NaCl concentration on protein solubility from S. alba meal

| Extraction | pH | % Protein in the extract | Napin | Cruciferin |
|---|---|---|---|---|
| Isopropanol (v/v) | | | | |
| 70% | as-it-is | 73.9 ± 0.8 | Yes | Yes |
| 50% | as-it-is | 68.3 ± 1.4 | Yes | Yes |
| 30% | as-it-is | 61.0 ± 1.9 | Yes | No |
|  | 4.5 | 61.5 ± 0.3 | Yes | No |
| 10% | as-it-is | 60.6 ± 3.6 | Yes | Yes |
| Ethanol (v/v) | | | | |
| 80% | as-it-is | 78.0 ± 2.4 | Yes | No |
|  | 4.5 | 75.7 ± 0.8 | Yes | No |
| 70% | as-it-is | 83.3 ± 0.5 | Yes | No |
|  | 4.5 | 81.4 ± 0.8 | Yes | Yes |
| 50% | as-it-is | 76.2 ± 2.7 | Yes | Yes |
| 20% | as-it-is | 56.1 ± 2.1 | Yes | Yes |
| 10% | as-it-is | 55.3 ± 1.5 | Yes | Yes |
| NaCl (w/v) | | | | |
| 2.0% | 3.0 | 70.9 ± 1.5 | Yes | No |
| 1.0% | 3.0 | 75.1 ± 0.1 | Yes | No |
| 0.75% | 3.0 | 80.5 ± 3.4 | Yes | No |
| 0.5% | 3.0 | 69.8 ± 3.7 | Yes | No |
| 0.25% | 3.0 | 67.9 ± 1.3 | Yes | No |

FIGS. 6A-6C shows polypeptide profiles of pH 9 and pH 12.5 extracts of remaining residue after low-pH extraction without any alcohols or salt (FIG. 6A) compared with alcohol containing extraction (FIG. 6B) and salt containing extraction (FIG. 6C). Partial recovery of napin in low pH extraction without any additive (alcohol or salt) was evident as pH 9 extract recovered remaining napin. Although 80% (v/v) ethanol and 30% (v/v) IPA was able to recover more napin at pH 4.5 the polypeptide profiles of pH 9 extract showed only marginal recovery of cruciferin remaining in meal residue. This may be an indication that remaining proteins may be less soluble at pH 9.0 after the alcohol wash at low pH.

Addition of NaCl at low pH improved napin solubility (FIG. 6C & Table 1). This increased solubility behaviour of napin under increasing ionic strength of the medium clearly indicated that napin association with other molecules has been disrupted due to increased salt-napin interactions. NaCl concentration at 0.75% (w/v) level was able to give maximum napin recovery. The extracts obtained at pH 12.5 (meal residue left after low-pH extraction) showed no polypeptide bands corresponding to napin (FIG. 6 C) indicating indeed these extraction conditions at pH 3 helped to dissolute napins in seed meal.

Data analysis of optimization study found that the highest total protein recovery can be obtained at meal-to-solvent ratio of 1:50 (w:v) and 82.5 min extraction time. These values were further examined since the extraction at 1:50 ratio requires handling of high volume of liquids in the next processing steps, such as filtering and drying. When actual protein dry weight and the protein content of the recovered material was compared, a repeated extraction (×2) at meal-to-solvent ratio of 1:22 (w:v) and extraction time of 120 min resulted in fairly similar values as obtained in the 1:50 (w:v) and 82.5 min extraction.

Example 5

Recovery of Cruciferin from Napin-Depleted Meal

Meal obtained from low pH extraction (1:22, w:v, 22° C., 120 min, pH 4.5 or 3.0, NaCl 0.0-2.0%) was further extracted with water at pH 9.0 or pH 10.0, 0.05 M NaOH or 0.10M NaOH (meal to solvent ratio 1:80 w:v, 22° C., 120 min) to solubilise remaining proteins. Extractions were carried out similar to low pH extraction and recovery of soluble materials also followed similar steps. The remaining meal residue (after both low and high pH extraction) was saved. Total protein content and polypeptide profiles of the extracts obtained were determined as mentioned above.

Cruciferins in the napin depleted meal can be extracted at basic pH or alkaline conditions, as shown in FIGS. 6A-6C and Table 2. An extraction pH of 9.0 or pH 12.5 was effective in solubilising cruciferin from the meal. Use of 0.1M NaOH for cruciferin extraction did not provide any additional protein recovery compared to 0.05M NaOH (Table 2).

TABLE 2

Alkali extraction of napin depleted meal

| Extraction variable | Protein content, % | |
|---|---|---|
| | Low pH extract | High pH extract |
| pH 4.5 then pH 9.0 | 72.70 ± 8.18 | 67.08 ± 0.85 |
| pH 3.0 then pH 10.0 | 67.08 ± 0.85 | 74.50 ± 4.20 |
| Alkali extraction following pH 3.0 extraction with 2% NaCl: | | |
| Water at pH 9.0 | 71.22 ± 1.72 | 75.28 ± 1.24 |
| 0.05 M NaOH | 70.23 ± 1.45 | 81.30 ± 2.52 |
| 01.0 M NaOH | 71.22 ± 1.72 | 86.50 ± 3.31 |
| 0.05M NaOH extraction following pH 3.0 extraction with: | | |
| 0.25% (w/v) NaCl | 67.91 ± 1.35 | 81.75 ± 1.81 |
| 0.50% (w/v) NaCl | 69.97 ± 3.72 | 98.77 ± 2.58 |
| 0.75% (w/v) NaCl | 77.56 ± 3.72 | 89.76 ± 5.16 |
| 1.00% (w/v) NaCl | 75.08 ± 1.84 | 82.27 ± 6.10 |
| 2.00% (w/v) NaCl | 70.23 ± 1.45 | 81.30 ± 2.52 |

Example 6

Development of a Combined Process to Recover Napin and Cruciferin Separately from *B. Napus* and *S. Alba* Meal FIG. 9 is a schematic diagram of the steps of the protein extraction process performed in this Example. FIG. 10 shows the key steps for the complete to process starting from seeds.

Dispersions of meal in distilled water (1:22, w:v) were prepared by mixing with super-Q water at room temperature. The pH of the dispersion was adjusted to 3.0 using 6 M HCl. NaCl crystals were added and the NaCl concentration of the slurry was adjusted to 0.75% (w/v). Extraction was performed for 120 min at 22° C. The pH was maintained throughout the extraction by adding acid or base if necessary. Following extraction, the slurry was centrifuged at (10,000×g) for 20 min at room temperature. The supernatant was filtered through a Whatman #1 filter paper under vacuum and saved. The residue obtained from centrifugation was extracted one more time under the same conditions and the supernatants recovered were combined and saved.

After repeated (2 times) extractions at pH 3 the remaining residue was dispersed in 0.05M NaOH (1:22, w:v). Alkali extraction followed the same steps as the low pH extraction. Remaining meal residue after low- and high-pH extractions was saved. The alkali supernatant extracts were combined as with the supernatants of the low pH extracts.

Desalting of low pH and alkali extracts was performed by ultrafiltration/diafiltration using Pellicon 2 Tangential Flow Filtration system equipped with a peristaltic pump (Ultra Tech).

The low pH extract was processed through a 5 kDa MWCO membrane (PLCCC-Regenerated cellulose minifilter, Millipore) and a diafiltration volume of 6H extract volume was used. Membrane filtration was continued until the chloride ion concentration of permeate becomes <100 ppm as measured using a chloride ion selective electrode. The retentate contained high concentration of napin and was freeze dried to obtain a dry powder.

The alkali extract was processed through a 100 kDa membrane (Biomax polyether sulfone minifilter, Millipore) with a diafiltration volume of 6× extract volume. The retentate contained high concentration of cruciferin and was freeze dried to obtain a dry powder. The residue left after acid and alkali extraction was also freeze dried.

The content of protein in the extracts was determined by Kjeldahl nitrogen analysis described above. Polypeptide profiles of the acid and alkali extracts and the residue were determined by SDS-PAGE separation. All the protein fractions obtained from the process were evaluated for presence of napin with *B. napus* and *S. alba* napin-antibodies using western blotting technique.

Napins were recovered during acid extraction. Membrane filtration using 5 kDa MWCO was able to remove most of NaCl and other small molecular weight compounds such as pigments and phenolics and improved the colour of the retained protein. Slight contamination with larger molecular weight polypeptides other than napins was possible as indicated by SDS-PAGE results (Product I, FIGS. 7A and 7B).

Most of the high molecular weight polypeptides that are from cruciferin were recovered by alkali extraction and retained during 100 kDa membrane filtration. Pigments and polymerized phenolics were also removed during the membrane separation step. Electrophoresis separation confirmed that polypeptides related to the cruciferin fraction only were present in the retentate of 100 kDa membrane separation (Product II, FIGS. 7A and 7B), i.e. no napin polypeptides were present. The remaining residue of the low pH and alkali extraction was very low in total protein and contained only non-napin polypeptides (Product III, FIGS. 7A and 7B). According to western blot results neither the alkali extract (product II) nor residue (product III) contained napin for both meals (FIG. 8), whereas napin was detected in the low pH extract (product I) for both meals.

Table 3 shows the material balance for dry matter in this combined process for both seed species. The three major products resulting from this process are as follow:

Product I—napin-rich (89 to 94% protein content);
Product II—cruciferin-rich (79% to 82% protein content); and
Product III—protein-deficient residue (4.6 to 33% protein content).

Between 89 to 95% of input dry matter was recovered in protein extracts (including retentate and permeates) and meal residue from both seed species using this process. Products I, II and III recovered 56 to 60% of meal dry matter.

Table 4 indicates the protein material balance for both seed species using this process. The three products (I, II and III) recovered nearly 68 to 71% of total meal proteins. About 7.3 to 12.8% of meal protein was isolated in permeates that are high in salt, acid and alkali and other small molecular weight molecules such as pigments and phenolics. According to protein material balance about 78 to 80% of meal protein from both seed species was captured in the process.

Example 7

Extraction of Commercial Canola Meal Using the Developed Process

Example 6 showed that the combined extraction process can recover napin and cruciferin from laboratory prepared *B. napus* and *S. alba* meals. Canola typically comprises mainly *B. napus* and is a major source of oilseed. The commercial canola seed crushing industry uses a prepressing operation combined with solvent (hexane) extraction to recover oil. The oil is extracted leaving meal as a seed residue containing the seed storage proteins. The primary use of canola meal is in animal feed as a protein source. Commercial canola meal is an abundant source for napin and cruciferin recovery.

Prepressed and solvent extracted commercial canola meal was obtained from the canola crushing facility in Saskatchewan that belongs to Bunge Foods™. The contents of moisture, oil and crude protein were analysed as described in previous experiments. Washing with hexane (1:5, w/v for 20 min stirring at ambient temperature) and subsequent removal of hexane by filtering under vauum (using GF/A and Whatman #1 filters) was carried out to remove residual oil from the meal. Protein extraction was carried out using the process described in Experiment 6. The content of protein in the freeze dried materials was determined by Kjeldahl nitrogen analysis.

The protein content of the commercial canola meal was low compared to laboratory prepared *B. napus* meal (Table 3). Commercial meal contains seed coats (hulls), which may have contributed to this low value. Table 3 shows the material balance for dry matter for commercial meal that was fractionated using the developed process. Hexane washing was done to remove residual oils (defatting) to see whether oil removal will enhance the protein recovery. The major products that come out of commercial canola meal from this process are napin-rich (Product I; 53.0 to 58.8% protein content), cruciferin-rich (Product II; 63.7 to 71.3% protein content) and protein-deficient (Product III; 30.3 to 33.0% protein content) fractions. As shown in FIG. 13 (Process I), product PIV (a napin-free meal, obtained by drying the residue recovered the low pH, aqueous extraction step) may also be obtained comprising from about 46 to about 50% protein.

Products I, II and III were able capture 72.8 to 75.5% of canola meal dry matter. Table 4 provides protein material balance for the process for the defatted or non-defatted commercial canola meal. The three products (I, II and III) obtained from commercial meal recovered nearly 78 to 80% of total meal proteins. About 6.5 to 7.0% of meal protein from the commercial canola meal was partitioned into permeates (permeate I and II) that are high in salt, acid and alkali and other small molecular weight components such as pigments and phenolics. According to protein material balance about 86% of protein was captured in the process. However, it should be noted that the protein content of the protein deficient residue (Product III) of the commercial meal after cruciferin and napin recovery was quite high compare to the laboratory prepared *B. napus* meal (Table 3). The commercial canola meal without defatting retained 39.5% of original meal protein content in the protein deficient residue (Product III) while the defatted commercial canola meal retained 43.2% of original meal protein content (Table 4). In contrast to this, the laboratory prepared *B. napus* meal retained only 1.2% of the original meal protein content as unextractable protein in the protein deficient residue (Product III). Also the protein content and mass of the napin-rich fraction (Product I) and cruciferin-rich fraction (Product II) from the commercial canola meal was lower than for the laboratory prepared meal (Table 3). This may be an indication that commercial oil extraction process renders the protein insoluble and unavailable for extraction.

TABLE 3

Dry matter mass balance and product protein content of the developed process.[a]

| Material | Input dry matter (g) Meal | NaCl | Product I | Permeate I | Product II | Permeate II | Product III | Total dry matter recovery (%) | Recovery as products I, II & III (% of meal dry matter) |
|---|---|---|---|---|---|---|---|---|---|
| *S. alba* | | | | | | | | | |
| Andante | 9.374 (58.66%) | 3.300 | 0.872 (90.86%) | 6.146 (8.58%) | 3.504 (82.16%) | 1.151 (15.02%) | 0.899 (7.40%) | 91.20 | 56.27 |
| AC Pennant | 9.235 (60.36%) | 3.300 | 0.993 (93.52%) | 6.227 (7.57%) | 3.034 (79.43%) | 1.092 (12.79%) | 1.559 (33.42%) | 95.10 | 60.49 |
| *B. napus* | 9.246 (54.04%) | 3.300 | 1.438 (89.09%) | 5.745 (4.86%) | 2.676 (82.38%) | 1.199 (7.01%) | 1.332 (4.67%) | 89.30 | 58.90 |

TABLE 3-continued

Dry matter mass balance and product protein content of the developed process.[a]

| Material | Input dry matter (g) Meal | NaCl | Out put dry matter (g) Product I | Permeate I | ProductII | Permeate II | Product III | Total dry matter recovery (%) | Recovery as products I, II & III (% of meal dry matter) |
|---|---|---|---|---|---|---|---|---|---|
| Commercial canola meal | | | | | | | | | |
| Without defatting | 8.764 (38.62%) | 3.300 | 0.373 (58.82%) | 5.075 (3.02%) | 1.807 (63.66%) | 1.295 (5.24%) | 4.432 (30.28%) | 107.6 | 75.45 |
| After defatting | 9.153 (39.69%) | 3.300 | 0.421 (53.07%) | 5.282 (2.77%) | 1.498 (71.28%) | 1.295 (8.61%) | 4.75 (33.06%) | 106.1 | 72.86 |

[a]All values are on dry weight basis. Starting meal was 10.000 g and corrected for moisture values.
Protein contents calculated as % Kjeldahl N x 6.25 are in parenthesis.

TABLE 4

Protein mass balance[a]

| Seed | Input protein dry mater (g) Meal | Other | Out put protein dry matter (g) Product I | Permeate I | Product II | Permeate II | Product III | Protein dry matter recovery (%) | Recovery as products I, II & III (% of meal dry matter) |
|---|---|---|---|---|---|---|---|---|---|
| S. alba | | | | | | | | | |
| Andante | 5.499 | 0 | 0.792 (14.40%) | 0.527 (9.58%) | 2.879 (52.35%) | 0.173 (3.15%) | 0.066 (1.20%) | 80.68 | 67.95 |
| AC Pennant | 5.574 | 0 | 0.929 (16.67%) | 0.471 (8.45%) | 2.410 (43.23%) | 0.140 (2.51%) | 0.521 (9.35%) | 80.21 | 69.25 |
| B. napus | 4.997 | 0 | 1.281 (25.63%) | 0.279 (5.58%) | 2.205 (44.13%) | 0.084 (1.68%) | 0.062 (1.24%) | 78.26 | 71.01 |
| Commercial canola meal | | | | | | | | | |
| Without defatting | 3.385 | 0 | 0.219 (6.47%) | 0.153 (4.52%) | 1.150 (33.97%) | 0.068 (2.00) | 1.342 (39.65%) | 86.61 | 80.09 |
| After defatting | 3.633 | 0 | 0.223 (6.14%) | 0.146 (4.02%) | 1.068 (29.40%) | 0.111 (3.06%) | 1.570 (43.21%) | 85.83 | 78.76 |

[a]Protein weights were values are calculated using % protein content (Table 3) and dry matter weight.
Out put protein content as percentage values of input protein are given in parenthesis

Example 8

Use of Organic Acids for Separation

Dehulled and defatted seed meals of *B. napus* and *S. alba* (AC Pennant) were utilized for this study. Extracts and residues were obtained as described above (Example 6) and were analyzed using SDS-PAGE separation to obtain polypeptide profiles. Purified napins and cruciferins were used as standards.

The Following solutions were prepared using citric acid and sodium citrate; 0.05 M pH 4.1; 0.1 M pH 4.1; and 0.2 M, pH values of 3.1, 4.1 and 5.1.

Meal slurries (1:20, w:v) were prepared using citrate buffers at different pHs and stirred for 120 min at ambient temperature. Soluble components were recovered by centrifugation of meal slurries. Residue remaining after centrifugation was suspended in fresh buffer (1:20 w:v) and re-extracted for another 120 min under same conditions. The supernatants resulting from the two extractions were combined and analysed for protein content and polypeptide profile. Meal residues remaining from the extractions were also analyzed.

Proteins of *S. alba* and *B. napus* were soluble in citric acid/Na citrate. The pH of the extraction was maintained at 4 opposed to pH 3. Table 5 shows the change of soluble protein content in the extracts due to the presence of citrate and Na ions at different concentrations. This shows that presence of these ions can improve solubility of napins at pH 4.0. There is no statistically significant difference between the concentration of citrate/Na ions and the amount of proteins recovered from meals. However, pH of the medium is effective in solubilizing more proteins (Table 5).

TABLE 5

Protein content of the extracts prepared form S. alba defatted meal using citric acid/citrate solutions at pH 4.0.

| Extraction solution[a] | Total meal protein extracted, %[b] |
|---|---|
| 0.05 M, pH 4.0 | 31.19 ± 0.70 |
| 0.10 M, pH 4.0 | 34.16 ± 4.23 |
| 0.20 M, pH 3.1 | 30.51 ± 11.28 |
| 0.20 M pH 4.1 | 38.32 ± 13.52 |
| 0.20 M pH 5.1 | 72.72 ± 15.11 |
| pH 3.0 water adjusted with 0.1M HCl | 31.16 |

Polypeptide profiles of the extracts and meals obtained from the citrate/Na extraction were obtained and are shown in FIG. 11.

Results using the extraction protocol as outlined in Example 6 (using purified proteins from B. napus and S. alba) showed that napin (two bands below 15 kDa under reducing conditions) and cruciferin (8 bands between 20 and 35 kDa under reducing conditions) give different banding pattern under both reducing and non-reducing conditions (FIG. 11). When $Na^+$/$citrate^{3-}$ ions were in the medium and pH was between 3 and 4, napins become soluble and insoluble cruciferins remain in the seed cellular matrix. This is similar to what was observed using solutions at pH 3 to 4 and containing 0.05 to 1.0 M NaCl with HCL as the acidulant.

The results presented in FIG. 11 demonstrate that citric acid/Na citrate solution at pH 3 and 4 can be used for selective solubilization of napins from B. napus and S. alba, and to produce an aqueous citrate/Na solution containing napin proteins and a residue devoid of napin. Values provided in Table 5 and polypeptide profiles of FIG. 11 show that by changing the concentration of citrate/Na ions in the extract medium more proteins can be extracted and a residue totally devoid of napin can be obtained.

Polypeptide profiles (FIG. 11) show that at 0.2 M and pH 5.1 cruciferins were solubilized and contribute to the higher protein content in the extract. If it is desired to keep cruciferin insoluble and selectively solubilize napin, then the pH should be kept at 4.0 or below for selective solubilisation of napin.

These results demonstrate that citric acid may be used to reduce pH, and that sodium citrate may be used to enhance the ionic strength for selective solubilisation of napin while keeping most of the cruciferin in insoluble form in the seed cellular matrix.

Example 9

Polysaccharide Degrading Enzymes

Results from Example 7 showed that the residue left after acid wash with NaCl or Na citrate contains primarily cruciferin of the seed storage proteins. The napin-free residue contains cruciferin and cell wall polysaccharides and other insoluble components at pH 4.0. Cell wall polysaccharides contain a major fraction of non-protein components of this residue. As an alternative to alkali extraction of cruciferin, removing other non-protein components that are not soluble at pH 4 by depolymerising cell wall polysaccharides to increase the protein content of the napin-free meal was examined.

Seed storage proteins of crucifers are stored in specialized compartments that are protein storage vacuoles (PSV). The PSVs are embedded in the cotyledons cells. The disintegration process that is used in seed meal preparation creates a mixture of broken cell walls, PSVs and other cellular components. The composition of plant cell wall is complex. Polysaccharides make up ~90% of the plant cell wall and are composed of cellulose (linear polymer of β-1,4-inked D-glucose residues), hemicellulose (heterogenous polymer of β-xylan chains substituted by L-arabinose, D-glactose, acetyl, feruloyl, p-coumaroyl and glucuronic acid residues) and pectins (heteropolymers of α-1,4-linked D-glactouronic acid residues interrupted by rhamnose residues.

Analysis of carbohydrates of oil-free dehulled rapeseed meal showed 29% of dry matter contains various polysaccharides composed of arabinogalactan, arabinan, amyloid, cellulosic residue and pectin (Siddiqui and Wood, 1977, *Journal of Science Food and Agriculture.* 28:530-538).

Racemized amino acids may be produced when alkali conditions are employed to solubilise proteins (Feeney, 1980, Overview on the chemical deteriorative changes of proteins and their consequences. In Chemical deterioration of to proteins. Eds. J. R. Whitaker and M. Fujimaki. American Chemical Society. Washington D.C. pp 3-55). Such modifications in amino acid residues lead to unavailability of essential amino acids e.g. formation of lysinoalanine as cross-links lower digestibility and biological value of proteins. Therefore, alternatives to alkali solubilisation of proteins was examined.

A series of B. napus and S. alba seed meal dispersions (1:22, w/v) were prepared with 0.75% (w/v) NaCl extraction at pH 3 as described above (Example 6), and citric acid/Na citrate (0.1 M) extraction (Example 8). Resulting meal residue was dispersed in super Q water (pH adjusted to 4.0 with 1 M HCl) mixed well and placed in a shaking water bath (reciprocal speed set at 80) and allowed to equilibrate at 45° C. Enzyme was added to the dispersions at 6.12, 12.25 and 18.36 units/g and incubated for 2.5 h. After the incubation time enzyme activity was stopped by immediate cooling of sample in an ice bath.

Samples were centrifuged at 4° C. for 20 min at 10,000×g, supernatant decanted and residue was washed with 10 ml of acidified water at pH 4.0. After dispersing by vortexing samples were centrifuged again under similar conditions as described above. Remaining pellet was dispersed in Super Q water and then pH was adjusted to 7.0 with 1 M NaOH and freeze dried to obtain dry residue. Total protein (% N×6.25) of each freeze dried residue was determined based on N analysis using combustion method.

Polypeptide profiles of the extracts were obtained by SDS-PAGE under reducing and non-reducing conditions.

Viscozyme® (from Novozyme; arabinase, cellulase, hemicellulase and xylanase activities), β-xylanase (xylan degrading activity only, from Megazyme), β-glucosidase (degrades beta glucosidase links only, from Megazyme) and a carbohydrase blend (cellulase, galactanase, glucanase, mannase, pectinase, and xylanase) were tested for their ability to reduce cell wall polysaccharides in the napin-free meal residue. An alcohol (20 and 70%, v/v ethanol) washing step was included after incubation to test the enhancement of the depolymerized polysaccharide removal from the remaining residue.

Table 2 compares protein content of remaining residue after incubation for 1.0, 2.5 and 5.0 h with and without Viscozyme at 45° C.

TABLE 6

Enrichment of proteins in the napin-free S. alba meal residue due to Viscozyme treatment[a].

| Enzyme dose, U/g | pH | Incubation temperature, °C. | Incubation time, h | Protein content of dry residue, % | Recovery of dry residue, % of starting meal |
|---|---|---|---|---|---|
| 0.00 | 2.8 | 45 | 1.0 | 69.3 | 45.6 |
|  |  |  | 2.5 | 69.5 | 44.3 |
|  |  |  | 5.0 | 69.5 | 44.3 |
| 6.12 | 2.8 | 45 | 1.0 | 74.3 | 41.2 |
|  |  |  | 2.5 | 74.6 | 38.9 |
|  |  |  | 5.0 | 74.7 | 37.5 |
| 12.24 | 4.0 | 45 | 2.5 | 84.5 | 32.5 |
| 18.36 | 4.0 | 45 | 2.5 | 85.6 | 31.1 |

[a]Starting seed meal contained 54.9% protein and after NaCl extraction at pH 3 ~50.0% of dry matter having 66.3% protein was recovered and used for this treatment.)

The results shown in Table 6 indicate that the protein content of the remaining residue was increased due to the enzyme activity. The increase in the protein content (from 66% to 74.5%) was substantial for the napin-free meal residue. At the same time a reduction of dry matter yield was also seen as a result of solubilising polysaccharides.

Depolymerizing of cellulose, hemicelluloses and pectin converts them into monomeric or oligomeric sugar units which may have different soluble characteristics than the respective polymers. Viscozyme L® possesses catalyzing activities of polysaccharide degrading and is produced by *Aspergillus niger*. This multi-component enzyme contains arabinase, cellulase, hemicellulase and xylanase activities which is advantageous to cleave the linkages within polysaccharide matrix including plant cell walls. The results are presented in Table 7.

TABLE 7

Effect of different polysaccharide degrading enzymes on enriching protein content of napin-free meal residue of S. alba.

| Enzyme dose, U/g | pH | Incubation temperature, °C. | Incubation time, h | Protein content of dry residue, % | Recovery of dry residue, % of starting meal |
|---|---|---|---|---|---|
| 0.00 | 4.0 | — | — | 66.3[a] | 50.4 |
| 0.00 | 4.0 | 45 | 2.5 | 74.7[b] | 42.9 |
| 0.00 | 4.0 | 45 | 5.0 | 73.8[b] | 41.3 |
| Carbohydrase blend (3.14 mg/g) | 4.0 | 45 | 2.5 | 75.6[b] | 41.8 |
|  | 4.0 | 45 | 5.0 | 77.3[b] | 36.6 |
|  |  |  | 16.0 | 84.8[b] | 17.5 |
| β-Xylanase (30 U/g) | 4.0 | 45 | 2.5 | 74.2[b] | 43.7 |
|  | 4.0 | 45 | 5.0 | 74.4[b] | 41.7 |
| β-Glucosidase (30 U/g) | 4.0 | 45 | 2.5 | 73.8[b] | 41.8 |
|  | 4.0 | 45 | 5.0 | 75.1[b] | 41.0 |
| Viscozyme (12.24 U/g) | 4.0 | 45 | 2.5 | 85.6[b] | 30.1 |
|  | 4.0 | 45 | 5.0 | 85.5[b] | 26.3 |

[a]No alcohol washing step
[b]70% alcohol washing step is included

The data presented in Table 7 shows carbohydrases that have different activities other than the mixture provided by Viscozyme do not enrich the protein content of the residue. When compared to the control, no loss of dry matter was observed due to these enzyme treatments furthermore confirming no carbohydrates (polysaccharides) were degraded. These results indicate that not all carbohydrases can be used for this step. Rather, enzymes that breakdown *Brassica* cell wall polysaccharides and have optimum activity between pH 3 and 4 are desired to enrich protein content of the napin-free residue.

As shown in Table 4, using 70% (v/v) ethanol, removal of depolymerised polysaccharides can be enhanced. As a result the content of protein (close to 86%) in the remaining residue can be improved compared to the water wash.

TABLE 8

Effect of aqueous ethanol wash on the protein content of napin-free residue of S. alba (meal was first extracted at pH 3 with 0.75% (w/v) NaCl).

| Enzyme dose, U/g | pH | Incubation temperature, °C. | Incubation time, h | Protein content of dry residue, % | Recovery of dry residue, % of starting meal |
|---|---|---|---|---|---|
| 0.00 | 4.0 | — | — | 66.3[a] | 50.4 |
| 0.00 | 4.0 | 45 | 2.5 | 74.7[b] | 44.2 |
| 0.00 | 4.0 | 45 | 5.0 | 73.7[b] | 41.3 |
| 12.24 | 4.0 | 45 | 2.5 | 84.5[a] | 32.5 |
| 12.24 | 4.0 | 45 | 2.5 | 83.5[d] | 31.0 |
| 12.24 | 4.0 | 45 | 2.5 | 85.6[b] | 30.1 |
| 12.24 | 4.0 | 45 | 2.5 | 85.2[c] | 33.5 |
| 12.24 | 4.0 | 45 | 5.0 | 82.0[d] | 28.5 |
| 12.24 | 4.0 | 45 | 5.0 | 85.5[b] | 26.3 |

[a]No alcohol washing
[b]After centrifugation residue was washed with 70% (v/v) ethanol
[c]After centrifugation residue was washed with deionized water at pH 4.0
[d]After centrifugation residue was washed with 20% (v/v) ethanol When water adjusted to pH 4.0 was used for washing (Table 8) similar results were obtained. These results demonstrate that by solubilising polysaccharides to solubilize can further concentrate proteins in the remaining dry residue.

Use of polysaccharide degrading enzymes especially that provide catalytic activities towards the cell wall, for example, the Brassicaceae cotyledon cell wall polysaccharides can improve protein content of the napin-free meal residue. Reduction of dry weight due to enzyme treatment may be due to the loss of cell wall polysaccharides after hydrolysing. It is preferred that the enzyme has an optimum activity between pH 3 and 4 so that cruciferin may be maintained in an insoluble state during the hydrolysis. Use of 70% (v/v) ethanol enhances the solubilisation of degraded polysaccharides thus enrich protein content in the residue.

Example 10

Combined Process to Recover Napin and Cruciferin Separately from *B. napus* and *S. alba* Meal The above Examples show that selective solubilisation of napin can be achieved at acidic pH conditions, and that by choosing suitable polysaccharide degrading enzymes and extraction conditions, cell wall polysaccharide content can be reduced to enrich protein content of the napin-free meal residue so obtained. By combining these extraction conditions and reaction sequences a process can be developed to obtain cruciferin- and napin-rich fractions separately from *B. napus* and *S. alba* meals.

Dispersions of 10 g of meal in distilled water (1:22, w:v) were prepared by mixing with 0.1 M citric acid/Na citrate buffer (pH 4.0) at room temperature. After 120 min of extraction the slurry was centrifuged at (10,000×g) for 20 min at room temperature. The supernatant was filtered through a Whatman #1 filter paper under vacuum and saved. The residue obtained from centrifugation was extracted one more time under same conditions and the supernatants recovered were combined and saved. After repeated (2 times) extractions at pH 4 the remaining residue was dispersed in super Q water (1:10, w:v). The pH of the slurry was between 4.0 and 4.1, no adjustments were carried out. The slurry was placed in a water bath and temperature was equilibrated to 45° C.

Viscozyme (12.24 units/g original meal) was added to the slurry and the same steps as low pH extraction were followed. Remaining meal residue after this extraction was saved.

Both low pH and alkali extracts were further separated by ultrafiltration/diafiltration using Pellicon 2 Tangential Flow Filtration system equipped with a peristaltic pump (Ultra Tech). Low pH extract was processed through a 5 kDa MWCO membrane (PLCCC-Regenerated cellulose minifilter, Millipore) and a diafiltration volume of 6H extract volume was used. Membrane filtration was continued until a conductivity less than or equivalent to 66 ppm of ($Na^+$) was achieved in the permeate. Retentate contained high concentration of napin and was freeze dried to obtain a dry powder. The residue left after acid and enzyme treatment was slurried in water, neutralized with 1.0 M NaOH, and then freeze dried.

The content of protein in the extracts was determined by nitrogen analysis. Polypeptide profiles of the extracts were determined by SDS-PAGE separation. Dietary fibre content was determined according to the standard total dietary fibre assay procedure (AOAC method 991.43, AACC method 32-07) with a Megazyme assay kit (Megazyme International Ireland Ltd., Wicklow Ireland).

As shown in FIG. 12, most of the napins were recovered during low pH extraction. Membrane filtration using 5 kDa MWCO was able to remove most of Na salts and other small molecular weight compounds such as pigments and phenolics and improved colour of retained protein. Citric acid/Na citrate combination provided much lighter colour to the napin fraction compared to HCl/NaCl extraction. Slight contamination with larger molecular weight polypeptides other than napins was possible as indicated by SDS-PAGE results.

Cruciferin recovery with cell wall degrading enzyme had fewer steps compared to our previous submission. No membrane separation step is needed to obtain cruciferin-rich fraction by this process. Cruciferin fraction had lighter colour compared to the product obtained by alkali solubilizaion and membrane separation. Use of enzymes to depolymerise cell wall polysaccharides has the advantage of controllability of the reactions and the side reactions are avoided compared to using chemicals for the same task.

Table 5 shows the material balance for dry matter in this combined process for both seed species.

TABLE 9

Dry matter mass balance and product protein content of the process using Citric acid/Na Citrate and Viscozyme.[a]

| | Input meal | Out put dry matter (g) | | | | | |
|---|---|---|---|---|---|---|---|
| Seed | dry matter (g) | Product P1A | Permeate I (Residue) | Product PV | Product PVI | Total dry matter recovery (%) | Recovery as Products P1A, PV & PVI (% of meal dry matter) |
| S. alba AC Pennant | 9.320 (62.73%) | 0.633 (89.77%) | 12.389 (4.96%) | 3.027 (81.40%) | 3.106 (39.30%) | 98.44 | 72.60 |
| B. napus | 9.493 (54.74%) | 1.055 (83.45%) | 12.329 (3.91%) | 2.488 (62.07%) | 3.318 (30.77%) | 99.33 | 71.77 |

[a]All values are on dry weight basis. Starting meal was 10.000 g and corrected for moisture values.

Protein contents calculated as % Kjeldahl N x 6.25 are in parenthesis.

TABLE 10

Protein mass balance and product protein content of the process using Citric acid/Na Citrate and Viscozyme[a].

| | Input protein dry matter (g) | | Out put protein dry matter (g)[b] | | | | Protein dry matter recovery as Products |
|---|---|---|---|---|---|---|---|
| Seed | Meal | Other | Product PIA | Permeate I (Residue) | Product V | Product VI | PIA, PV & PVI (%) |
| S. alba AC Pennant | 5.846 | 0 | 0.568 | 0.614 | 2.464 | 1.220 | 72.73 |
| B. napus | 5.198 | 0 | 0.839 | 0.482 | 1.544 | 1.020 | 65.47 |

[a]Dehulled defatted meal was used.

[b]Products refer to FIG. 4.

Two major protein products (Product IA; (PIA) and Product V (PV)) are obtained from this process (FIG. 13). PIA is a napin-rich product having 83 to 90% protein content and PV is a cruciferin-rich product having 62% to 81% protein content. Fractions. A protein-deficient fraction having 4.6 to 33% protein content is also produced. A polysaccharide degraded products containing fraction (Product VI (PVI)) also contains high protein content (31 to 39%) which may mainly contain cruciferin.

The process steps shown in FIG. 13 results in at least 98% of the input dry matter was recovered in the fractions and the residues. Products PIA, PV and PVI were able to capture 71 to 73% of meal dry matter. Table 10 provides protein material balance for the process. The three products (PIA, PV and PVI) recovered nearly 66 to 73% of total meal proteins.

Analysis of dietary fibre contents of the products are provided in Table 11. The values show that in fact the total dietary fibre content of the remaining residue is lower than the starting meal.

TABLE 11

Dietary fibre values for *Sinapis alba* meal and products.

| Sample | Insoluble fibre, % | Soluble fibre, % | Total dietary fibre, % |
|---|---|---|---|
| Meal | 11.72 | 3.08 | 14.80 |
| HCl/NaCl[a] extraction | | | |
| After pH 3 extraction | 20.02 | 1.15 | 21.17 |
| pH 3 extraction + Viscozyme[b] treatment | 9.64 | 1.79 | 11.42 |
| Citric acid/Na Citrate[c] extraction | | | |
| After pH 4 extraction | 18.95 | 1.14 | 20.09 |
| pH 4 extraction + Viscozyme[b] treatment | 11.14 | 1.36 | 12.50 |

[a]0.75% (w/v) NaCl, pH 3.0, 22° C., 2 h,
[b]12.24 U/g, pH 4.0, 45° C., 2.5 h, water wash only
[c]0.1 M citrate solution Total amino acid profiles of the various fractions produced as outlined above are presented in Table 12 and compared with FOA/WHO requirements.

TABLE 12

Amino acid composition of fractions; Meal: PIV; Napin isolate: P1A; Cruciferin isolate (values are in mg/g protein)

| Amino acid | FAO/WHO pattern[a] | *Sinapis alba* fractions | | | *Brassica napus* fractions | | |
|---|---|---|---|---|---|---|---|
| | | Meal | Napin | Cruciferin | Meal | Napin | Cruciferin |
| Acidic | | | | | | | |
| Asp + Asn | — | 54.0 | 39.7 | 84.2 | 38.5 | 90.8 | 92.6 |
| Glu + Gln | — | 93.4 | 23.0 | 120.8 | 84.9 | 113.5 | 174.3 |
| Polar, uncharged | | | | | | | |
| Cys + ½Cys | 16 (+Met) | 18.8 | 56.2 | 6.8 | 21.8 | 65.1 | 12.0 |
| Gly | — | 35.6 | 44.7 | 51.3 | 26.2 | 51.7 | 59.4 |
| Ser | — | 25.9 | 34.2 | 37.8 | 20.2 | 41.7 | 48.3 |
| Thr | 9 | 20.5 | 27.7 | 32.7 | 20.5 | 35.7 | 38.2 |
| Tyr | (+Phe) | 14.0 | 13.6 | 29.0 | 14.0 | 27.0 | 22.1 |
| Hydrophobic | | | | | | | |
| Ala | — | 27.0 | 34.4 | 38.2 | 20.5 | 41.7 | 46.7 |
| Ile | 13 | 28.5 | 33.5 | 41.3 | 18.3 | 48.0 | 53.8 |
| Leu | 19 | 34.8 | 48.0 | 54.4 | 32.6 | 54.6 | 58.1 |
| Met | (+Cys) | 11.3 | 14.6 | 16.3 | 11.4 | 21.4 | 19.6 |
| Phe | 19 | 20.7 | 23.0 | 33.8 | 18.8 | 34.1 | 35.6 |
| Pro | — | 32.3 | 75.2 | 35.5 | 26.1 | 37.3 | 59.6 |
| Trp | 5 | 8.2 | 8.4 | 10.7 | 7.2 | 10.5 | 10.9 |
| Val | 13 | 22.2 | 31.7 | 34.8 | 20.5 | 40.8 | 40.6 |
| Basic | | | | | | | |
| Arg | — | 25.6 | 41.8 | 41.8 | 32.7 | 43.4 | 46.7 |
| His | — | 11.9 | 30.0 | 14.1 | 15.8 | 14.6 | 19.8 |
| Lys | 16 | 21.6 | 50.1 | 18.3 | 25.3 | 27.5 | 40.2 |
| Total essential amino acids[b] | 111 | 200.6 | 306.8 | 241.1 | 190.4 | 364.7 | 331.1 |
| Total S-amino acids[c] | 17 | 30.1 | 70.8 | 23.1 | 33.2 | 86.5 | 31.6 |
| Total branched chain amino acids[d] | 45 | 85.5 | 112.5 | 130.5 | 71.4 | 143.4 | 152.5 |

[a]FAO/WHO/UNU (1985) suggested pattern of requirement of Essential amino acids (mg/g crude protein) for adults.
[b]Sum of Ile, Leu, Lys, Met + Cys, Phe + Tyr, Thr, Trp, Val (ideal amino acid pattern for adult is 151.5 mg/g protein)
[c]Sum of Cysteine and Methionine (in the ideal amino acid pattern for an adult is 24 mg/g protein)
[d]Sum of Leu, Ile, Val (in the ideal amino acid pattern for adult the total is 61 mg/g protein)

The protein fractions have comparable essential amino acid profiles as the FAO/WHO essential amino acid requirement pattern for adults. The fractions are rich in sulfur-containing amino acids. The napin fraction especially, have higher levels of cysteine. This could be advantageous for napins that are non-allergenic such as from *B. napus*. Proteins containing high levels of Cysteine are involved in alleviating insulin resistance (central to onset of metabolic syndrome) by affecting the glutathione redox status.

FIG. 13 shows a combined Brassicaceae oilseed meal protein fractionation process showing three options; Process I, Process II and Process III. FIGS. 14, 15 and 16 show each of these processes separately. These proposed modifications of the process have several advantages. The process employs simple and regularly used unit operations in processing plants, uses chemical input that are of food grade (HCl, NaCl, citric acid, sodium citrate). Use of enzymes in the process allows easy control and most importantly prevents destruction of essential amino acids and unwanted cross linking. The processes described here provide Brassicaceae protein fractions that are separated into Napin and cruciferin. Further purification and protein enrichment of these fractions can be through membrane filtration, alkali solubilization or by using suitable enzymes that catalyze hydrolysis of cell wall polysaccharides. Protein fractions so obtained have different amino acid compositions based on the predominant protein in the fraction. Therefore the control of quality and functionality of the protein fraction is easy and are predictable and their control in applications for example commercial applications, is easy. Protein fractions rich in napin or cruciferin have a value as plant protein sources in both nutritional and technological applications. The products of the described process are unique and different in composition than the products of other *Brassica* protein processing methods available. Currently available methods produce mixtures of seed storage proteins and thus differ in quality.

Combination of low pH extraction with NaCl or Na citrate and alkali extraction or enzyme-assisted cell wall hydrolysis in sequence recovered napin and cruciferin from *B. napus* and *S. alba* meals. Ultrafiltration with suitable MWCO membranes enabled to enrich proteins in these extracts. The process steps when continued in sequence provide three distinctly different protein containing products; napin-rich, cruciferin-rich and protein-low All citations are hereby incorporated by reference.

The present invention has been described with regard to one or more embodiments. However, it will be apparent to persons skilled in the art that a number of variations and modifications can be made without departing from the scope of the invention as defined in the claims.

REFERENCES

Adachi, M., Kanamori, J., Masuda, T. Yagasaki, K. Kitamura, K. Mikami, B., Utsumi, S. Crystal structure of soybean 11S globulin: Glycinin A3B4 homohexamer. *Proceedings of National Academy of Science USA*. 2003, 100 (12), 7395-7400.

AOCS, 1990. AOCS Official Method Ba 4b-87. Official Methods and Recommended Practices of the American Oil Chemists' Society, 4$^{th}$ Edition.

Bérot, S., Compoint, J. P., Larré, C., Malabat, C., Guéguen, J. Large scale purification of rapeseed proteins (*Brassica napus* L.). *Journal of Chromatography B*, 2005, 818, 35-42, Breene, J. P.; Crouch, M. L., Molecular analysis of a cruciferin storage protein gene family of *Brassica napus*. *Plant Molecular Biology*, 1992, 19, 1049-1055.

Casey, R. Distribution and some properties of seed globulins. In Seed Proteins, Ed. Shewry, P. and Casey, R. Kluwer Academic, London, 1999. pp. 159-169.

Crouch, M. L., Tenbarge, K. M., Simon, A. E., Ferl, R., cDNA clones for *Brassica napus* seed storage proteins: evidence from nucleotide analysis that both its of napin are cleaved from a precursor polypeptide. *Journal of Molecular and Applied Genetics*, 1983, 2, 273-283.

Crouch, M. L.; Sussex, I. M., Development and storage-protein synthesis in *Brassica napus* L. embryos in vivo and in vitro. *Planta*, 1981, 153, 64-74.

Dalgalarrondo, M., Robin, J-M., Azanza, J-L. Subunit composition of the globulin fraction of rapeseed (*Brassic napus*). *Plant Science*, 1986, 43, 115-124.

Delseny, M. & Raynal, M. Globulin storage proteins in crucifers and non-legume dicotyledonous families. In Seed Proteins, Ed. Shewry, P. And Casey, R. Kluwer Academic, London, 1999, pp. 427-451.

Diosady, L. L., Rubin, L. J., Tzeng. Y-M. Production of rapeseed protein materials. U.S. Pat. No. 4,889,921 (Dec. 26, 1989)

Diosady, L. L., Xu, L., Chen, B-K; Production of high quality protein isolates from defatted meals of *brassica* seeds. U.S. Pat. No. 6,905,713 (Jan. 14, 2005)

Gosnell, B., Segall, K. I., Schweizer, M. Production of canola protein. US Patent Application 2007/0004908 A1 (Jan. 4, 2007).

Gehrig, P. M. & Biemann, K., Assignment of the disulfide bonds in napin; a seed storage protein from *Brassica napus* using matrix-assisted laser desorption ionization mass spectrometry. *Peptide Research*, 1996, 9 (6), 308-314.

Inquello, V., Raymond, J., Azanza, J. L., Disulfide interchange reactions in 11S globulin subunits in Cruciferae seeds—Relationships to gene families. *European Journal of Biochemistry*, 1993, 217, 891-895.

Laemmli, K. E. Cleavage of structural proteins during assemble of the head of bacteriophage T. *Nature* (London), 1970, 277, 680-685.

Lindeboom, N. and Wanasundara, P. K. J. P. D. Interference of phenolic compounds of *Brassica napus, Brassica, rapa* and *Sinapis alba* seed protein quantitation by Lowry protein assay. *Food Chemistry*, 2007, 104, 30-38.

Logie, J. and Milanova, R. Canola Protein isolate compositions. US 2004/0034200 A1, Feb. 19, 2004.

Lonnerdal, B., Janson, J.-C., The low molecular weight proteins in rapeseed, isolation and characterization. *Biochemica et Biophysica Acta*, 1972, 278, 175-183.

Malabat, C., Atterby, H., Chaudhry, Q., Renard, M., Guéguen, J., Genetic variability of rapeseed protein composition. *Proceedings of 11th International Rapeseed Congress*. 2003, Volume 1 pp 205-208.

Monsalave, R. López-Otin, C. Villalba, M. and Rodrigues, R. A new distinct group of 2S albumins from rapeseed. *FEBS Letters*, 1991, 295, 207-210.

Monsalve R. I., Gonzáles de la Peña, M. A., López-Otín C., Fiandor, A., Fernández, C. Villalba, M., Rodríguez, R. Detection, isolation and complete amino acid sequence of an aeroallergenic protien from rapeseed flour. *Clinical and Experimental Allergy* 1997. 27, 833-841.

Monslave R. I., Villalba, M., Rodríguez, R. Allergy to mustard seeds: The importance of 2S albumins as food allergens. *Internet Symposium on Food Allergens*, 2001, 3(2) 57-69.

Murén, E. Ek, B., Björk, I., Rask, L. Structural comparison of the precursor and the mature form of napins the 2S storage protein in *Brassic napus. European Journal of Biochemistry,* 1996, 242, 214-219.

Murray, E. D., Maurice, T. J., Barker, L. D. Myer, D. Process for isolation of proteins using food grade salt solutions at specified pH and ionic strength. U.S. Pat. No. 4,208,323 (Jun. 17, 1980)

Murray, E. D. Oil seed protein extraction. WO 97/27761 A1, Aug. 7, 1997.

Newkirk, R. W., Maenz, D. D., Classen, H. L. Oilseed processing. U.S. Pat. No. 7,090,887B2 (Aug. 15, 2006)

Osborne, T. B., *The Vegetable Proteins,* $2^{nd}$ Edition. Longmans, Green and Co., London, 1924; pp. 51-56.

Sjodahl, S., Rodin, J. Rask, L., Characterization of the 12S globulin complex of *Brassica napus* (evolutionary relationship to other 11-12S storage globulins). *European Journal of Biochemistry,* 1991, 196, 617-621.

Rask, -L. E., -M., Ezcurra, -I., Stalberg, -K., Wycliffe, -P. Seed-specific regulation of the napin promoter in *Brassica napus Journal of Plant Physiology,* 1998, 152, 595-599.

Schweizer, M., Green, B. E., Segall, K. I., Willardsen, R. Novel canola protein isolate. US Patent application 2005/0181112 A1 (Aug. 18, 2005)

Schwenke, K. D., Raab, B., Linow, K. J., Platz, W., Uhlin, J., Isolation of the 12S globulin from rapeseed (*Brassica napus* L.) and characterization as a neutral protein. *Nahrung,* 1981, 25, 271-280.

What is claimed is:

1. A process of aqueous protein extraction from Brassicaceae oilseed meal to obtain a napin-rich protein extract, a cruciferin-rich protein extract, and a low-protein residue, the process comprising the steps of:
   (a) performing aqueous extraction of the Brassicaceae oilseed meal at a temperature of from about 18° C. to about 50° C. using an aqueous solvent at a pH of from 2.5 to 3.5 containing a salt at a concentration of from 0.25% to 2.0% w/v of the aqueous solvent, wherein the Brassicaceae oilseed meal is mixed with the aqueous solvent at a meal-to-aqueous solvent ratio of from about 1:10 to about 1:90, to obtain:
      (i) a soluble napin-rich protein extract; and
      (ii) a cruciferin-rich protein residue; and
   (b) performing aqueous extraction of the cruciferin-rich protein residue from step (a) at a temperature of from about 18° C. to about 50° C. using an aqueous alkali solvent at a pH of from about 7.0 to about 13.0, wherein the cruciferin-rich protein residue is mixed with the aqueous alkali solvent at a residue-to-aqueous alkali solvent ratio of from about 1:10 to about 1:90, to obtain:
      (i) a soluble cruciferin-rich protein extract; and
      (ii) a low-protein residue,
   wherein, steps (a) and (b) are performed sequentially.

2. The process of claim 1, wherein the cruciferin-rich protein extract is substantially free of napin protein.

3. The process of claim 1, wherein the napin-rich protein extract comprises from about 50% to about 95% total protein content.

4. The process of claim 1, wherein the cruciferin-rich protein extract comprises from about 60% to about 98% total protein content and is substantially free of napin protein.

5. The process of claim 1, wherein the low-protein residue comprises from about 1% to about 40% total protein content.

6. The process of claim 1, wherein the napin-rich protein extract, the cruciferin-rich protein extract and the low-protein residue comprise from about 50% to about 98% of total Brassicaceae oilseed meal protein.

7. The process of claim 1, wherein the aqueous solvent is alcohol, water or a combination thereof.

8. The process of claim 1, wherein the aqueous extraction of the Brassicaceae oilseed meal of step (a) is carried out for about 25 minutes to about 360 minutes.

9. The process of claim 1, wherein the aqueous extraction of the cruciferin-rich protein residue of step (b) is carried out for about 25 minutes to about 360 minutes.

10. The process of claim 1, wherein the Brassicaceae oilseed meal is commercial canola meal or yellow mustard flour.

11. A process of aqueous protein extraction of Brassicaceae oilseeds to obtain a napin-rich protein extract, a cruciferin-rich protein extract, and a low-protein residue, the process comprising the steps of:
    (a) dehulling the Brassicaceae oilseeds to substantially separate Brassicaceae oilseed cotyledons from Brassicaceae oilseed hulls;
    (b) defatting the Brassicaceae oilseed cotyledons to obtain Brassicaceae oilseed meal;
    (c) performing aqueous extraction of the Brassicaceae oilseed meal at a temperature of from about 18° C. to about 50° C. using an aqueous solvent at a pH of from 2.5 to 3.5 containing a salt at a concentration of from 0.25% to 2.0% w/v of the aqueous solvent, wherein the Brassicaceae oilseed meal is mixed with the aqueous solvent at a meal-to-aqueous solvent ratio of from about 1:10 to about 1:90, to obtain:
       (i) a soluble napin-rich protein extract; and
       (ii) a cruciferin-rich protein residue; and
    (d) performing aqueous extraction of the cruciferin-rich protein residue from step (c) at a temperature of from about 18° C. to about 50° C. using an aqueous alkali solvent at a pH of from about 7.0 to about 13.0, wherein the cruciferin-rich protein residue is mixed with the aqueous alkali solvent at a residue-to-aqueous alkali solvent ratio of from about 1:10 to about 1:90, to obtain:
       (i) a soluble cruciferin-rich protein extract; and
       (ii) a low-protein residue,
    wherein steps (a)-(d) are performed sequentially.

12. A process of aqueous protein extraction from Brassicaceae oilseed meal to obtain a napin-rich protein extract, a cruciferin-rich protein fraction, and a sugar rich fraction comprising:
    (a) performing a first aqueous extraction of the Brassicaceae oilseed meal at a temperature of from about 18° C. to about 50° C. using an aqueous solvent at a pH of from 2.5 to 3.5 containing a salt at a concentration of from 0.25% to 2.0% w/v of the aqueous solvent, wherein the Brassicaceae oilseed meal is mixed with the aqueous solvent at a meal-to-aqueous solvent ratio of from about 1:10 to about 1:90, to obtain:
       (i) a soluble napin-rich protein extract; and
       (ii) a cruciferin-rich protein residue; and
    (b) performing a second aqueous extraction of the cruciferin-rich protein residue from step (a) at a temperature of from about 35° C. to about 60° C. and at a pH of from about 3.0 to about 4.5 in the presence of one or more cell wall degrading enzymes to obtain:
       (i) a soluble sugar rich extract; and
       (ii) a cruciferin-rich protein residue; and
    (c) separating the cruciferin-rich protein residue from the soluble sugar rich extract from step (b) to obtain the cruciferin-rich protein fraction and the sugar rich fraction, wherein steps (a)-(c) are performed sequentially.

13. The process of claim 12, wherein in the step of performing the second aqueous extraction of step (b), the temperature of the second aqueous extraction is from 40° C. to 60° C.

14. The process of claim 13, wherein the cruciferin-rich protein fraction is substantially free of napin protein.

15. The process of claim 13, wherein the napin-rich protein extract comprises from about 50% to about 95% total protein content.

16. The process of claim 13, wherein the cruciferin-rich protein fraction comprises from about 60% to about 98% total protein content and is substantially free of napin protein.

* * * * *

UNITED STATES PATENT AND TRADEMARK OFFICE
CERTIFICATE OF CORRECTION

PATENT NO.       : 8,557,963 B2
APPLICATION NO.  : 12/451804
DATED            : October 15, 2013
INVENTOR(S)      : Wanasundara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 105 days.

Signed and Sealed this

Fifteenth Day of September, 2015

Michelle K. Lee
*Director of the United States Patent and Trademark Office*